(12) United States Patent
Jacques

(10) Patent No.: US 12,044,383 B2
(45) Date of Patent: Jul. 23, 2024

(54) SOLAR POWERED STREET LAMP

(71) Applicant: Jonathan Jacques, Peabody, MA (US)

(72) Inventor: Jonathan Jacques, Peabody, MA (US)

( * ) Notice: Subject to any disclaimer, the term of this patent is extended or adjusted under 35 U.S.C. 154(b) by 181 days.

(21) Appl. No.: 17/445,358

(22) Filed: Aug. 18, 2021

(65) Prior Publication Data
US 2022/0128205 A1    Apr. 28, 2022

Related U.S. Application Data

(60) Provisional application No. 63/104,004, filed on Oct. 22, 2020, provisional application No. 63/067,019, filed on Aug. 18, 2020.

(51) Int. Cl.
| | |
|---|---|
| *F21S 8/08* | (2006.01) |
| *B60L 53/35* | (2019.01) |
| *B60L 53/51* | (2019.01) |
| *B60L 53/52* | (2019.01) |
| *B64F 1/36* | (2017.01) |
| *F03D 9/00* | (2016.01) |
| *F21S 8/00* | (2006.01) |
| *F21S 9/02* | (2006.01) |
| *F21S 9/03* | (2006.01) |
| *F21V 33/00* | (2006.01) |
| *F24S 23/70* | (2018.01) |

(Continued)

(52) U.S. Cl.
CPC ............... *F21S 9/035* (2013.01); *B60L 53/35* (2019.02); *B60L 53/51* (2019.02); *B60L 53/52* (2019.02); *B64F 1/362* (2013.01); *F03D 9/007* (2013.01); *F21S 8/085* (2013.01); *F21S 9/026* (2013.01); *F21V 33/006* (2013.01); *F24S 23/70* (2018.05); *H02J 7/35* (2013.01); *H02S 20/10* (2014.12); *H02S 40/22* (2014.12); *B60L 2200/10* (2013.01); *F05B 2220/708* (2013.01); *F24S 2023/86* (2018.05); *H02J 7/0047* (2013.01)

(58) Field of Classification Search
CPC .. F21S 8/085; F21S 8/086; F21S 8/088; F21S 9/03–037; B60L 53/51–68
See application file for complete search history.

(56) References Cited

U.S. PATENT DOCUMENTS

| | | | |
|---|---|---|---|
| 9,387,928 B1 * | 7/2016 | Gentry | ................... B60L 53/00 |
| 2016/0013347 A1 * | 1/2016 | Weffer | ................ H01L 31/0543 |
| | | | 136/246 |

(Continued)

*Primary Examiner* — Sean P Gramling
(74) *Attorney, Agent, or Firm* — Lathrop GPM LLP; Ricardo Ochoa

(57) ABSTRACT

Solar powered lamp posts are described. One post includes one or more solar panel assemblies located in an inverted pyramid cavity. The solar panel assemblies are configured to generate energy, for example, by collecting sun light. One or more drone charging stations are also provided which can charge a drone using the energy generated. The post also feature one or more light emitters powered by the energy generated. The post may also include a pyramid structure which supports the solar panel assemblies and the drone charging stations. The pyramid structure can include the solar panel assemblies on outward facing sides and open up to expose the drone charging stations. The solar panel assemblies may include a broom panel array. The array has a multiple power generating panels and a socket which secures each of the power generating panels in a radial direction from a central focal point.

30 Claims, 54 Drawing Sheets

(51) Int. Cl.
 *H02J 7/35* (2006.01)
 *H02S 20/10* (2014.01)
 *H02S 40/22* (2014.01)
 *H02J 7/00* (2006.01)

(56) References Cited

U.S. PATENT DOCUMENTS

2016/0099362 A1* 4/2016 Bellette .............. H01L 31/0547
 136/246
2016/0347192 A1* 12/2016 Lee ....................... B64C 39/024

* cited by examiner

Home

User
J. Appleseed

5600

Role: System Admin
Last Login: 7 July 2021 19:35
Notifications: 3

Daily Statistics
8 July 2021 17:00 street Lights
Lights On: 227
Lights Off: 49
Lights Disabled: 2

Drone Charging Stations
Charges in progress: 31
Charges complete: 118
Stations Available: 414
Stations Disabled: 1

< Main Street 1-A

Station 1-1

Location: 40.7128° N, 74.0060° W

Status

Charge Level: '100%

Light: On

Drones Charging: 1

Controls

6500

< Stations 1-1    Charging Pad Lift

Center Charging Pad

Status

Raised

Override

Lower ————————◯ Raise

⟨ Station 1-1    Pyramid Section

Pyramid

6600

Status

Open

Override

Closed ————————○ Open

Station 1-1  Hemisphere Motor

Hemisphere

Status

Open

Override

Closed ────────○ Open

SOLAR POWERED STREET LAMP

STATEMENT REGARDING FEDERALLY SPONSORED RESEARCH OR DEVELOPMENT

N/A

BACKGROUND OF THE INVENTION

Various embodiments relate generally to modular wall systems, methods, and devices and, more specifically, relate to solar powered devices that can be used to solar powered street lamps.

This section is intended to provide a background or context. The description may include concepts that may be pursued, but have not necessarily been previously conceived or pursued. Unless indicated otherwise, what is described in this section is not deemed prior art to the description and claims and is not admitted to be prior art by inclusion in this section.

Street lamps provide lighting in many situations. Using solar panels for these lights can reduce or remove the power demands.

BRIEF SUMMARY OF THE INVENTION

The below summary is merely representative and non-limiting.

The above problems are overcome, and other advantages may be realized, by the use of the embodiments.

In a first aspect, an embodiment provides a solar powered lamp post. The solar powered lamp post includes one or more solar panel assemblies located in an inverted pyramid cavity. The solar panel assemblies are configured to generate energy, for example, by collecting sun light. One or more drone charging stations are also provided which can charge a drone using the energy generated. The post also feature one or more light emitters powered by the energy generated.

The solar powered lamp post may also include a pyramid structure which supports the solar panel assemblies and the drone charging stations. The pyramid structure can include the solar panel assemblies on outward facing sides and open up to expose the drone charging stations.

In another aspect, an embodiment provides a broom panel array. The array has a multiple power generating panels and a socket which secures each of the power generating panels in a radial direction from a central focal point.

BRIEF DESCRIPTION OF THE SEVERAL VIEWS OF THE DRAWINGS

Aspects of the described embodiments are more evident in the following description, when read in conjunction with the attached Figures.

FIG. 66 illustrates a pyramid control screen for the application.

DETAILED DESCRIPTION OF THE INVENTION

Figure 1:
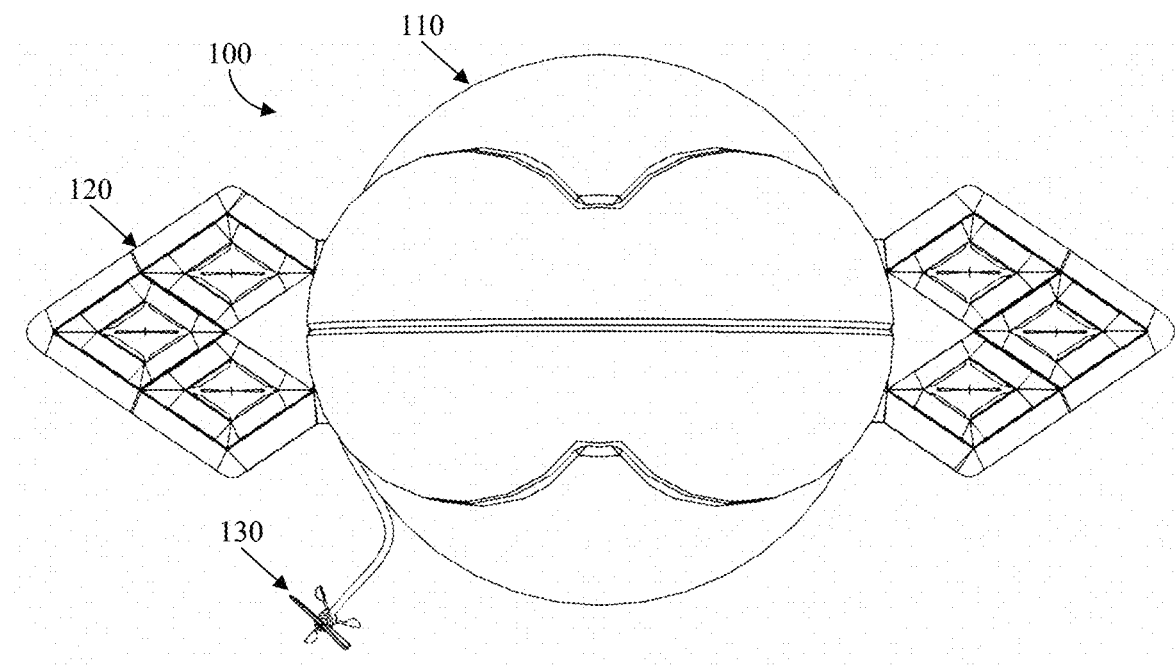
FIG. 1 shows a top-down view of a drone charging lamp post.

This patent application claims priority from U.S. Provisional Patent Application No. 63/067,019, filed Aug. 18, 2020, and U.S. Provisional Patent Application No. 63/104,004, filed Oct. 22, 2020, the disclosures of which are incorporated by reference herein in their entirety.

Various embodiments provide solar charged lamp posts. Such posts include a drone recharging station. These lamp post may include features of the pyramid wall system (PWS) described in U.S. Patent Publication 2020/0333571, published Oct. 22, 2020; U.S. Pat. No. 10,707,807, issued Jul. 7, 2020; U.S. Pat. No. 9,929,691, issued Mar. 27, 2018; and U.S. Provisional Patent Application No. 62/321,287, filed Apr. 12, 2016, the disclosures of which are incorporated by reference herein in their entirety.

FIGS. 1-6 show a drone charging lamp post 100. The drone charging lamp post 100 includes a top cover 110, side rhombuses 120 and a weather detection system 130. As shown in these figures, the side rhombuses 120 may be rotated around axle 126. Additionally, the side rhombuses 120 may swiveled around the top cover 110 by moving swiveling element 140. Alternatively, various features of the upper portion of the drone charging lamp post 100 may be rotated and/or swiveled. By rotating/swiveling the side rhombuses 120, they may be positioned to better receive incoming light and/or to better withstand any weather effects, for example, by reducing lift created by the wind.

Figure 2:
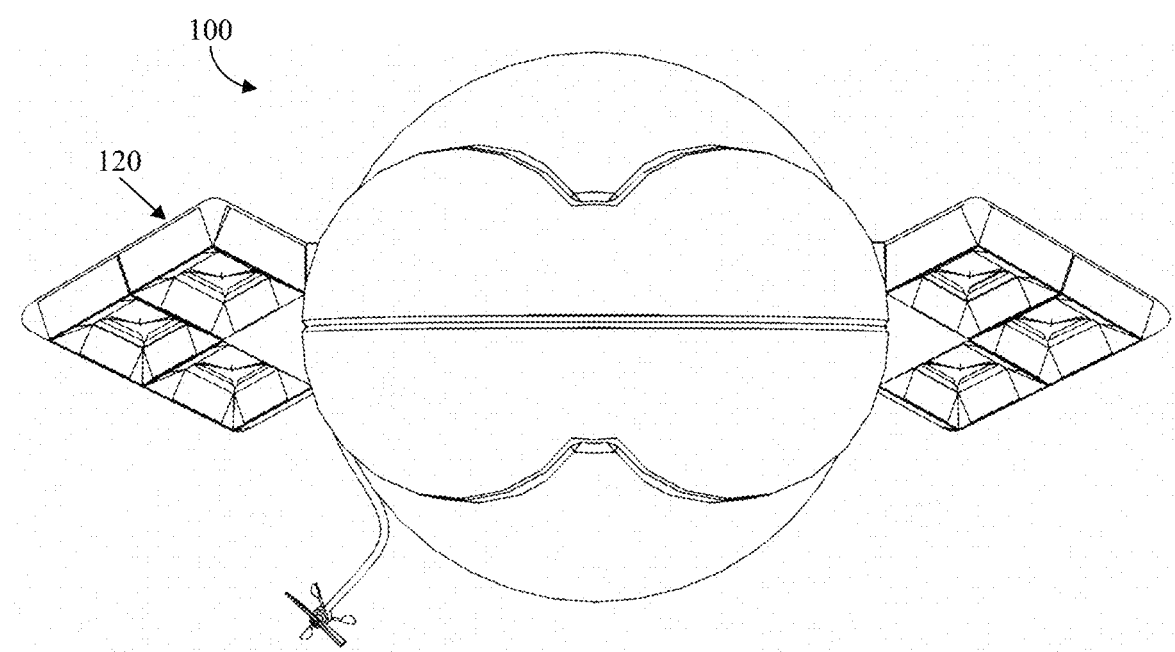
FIG. 2 shows another top-down view of the drone charging lamp post.
Figure 3:
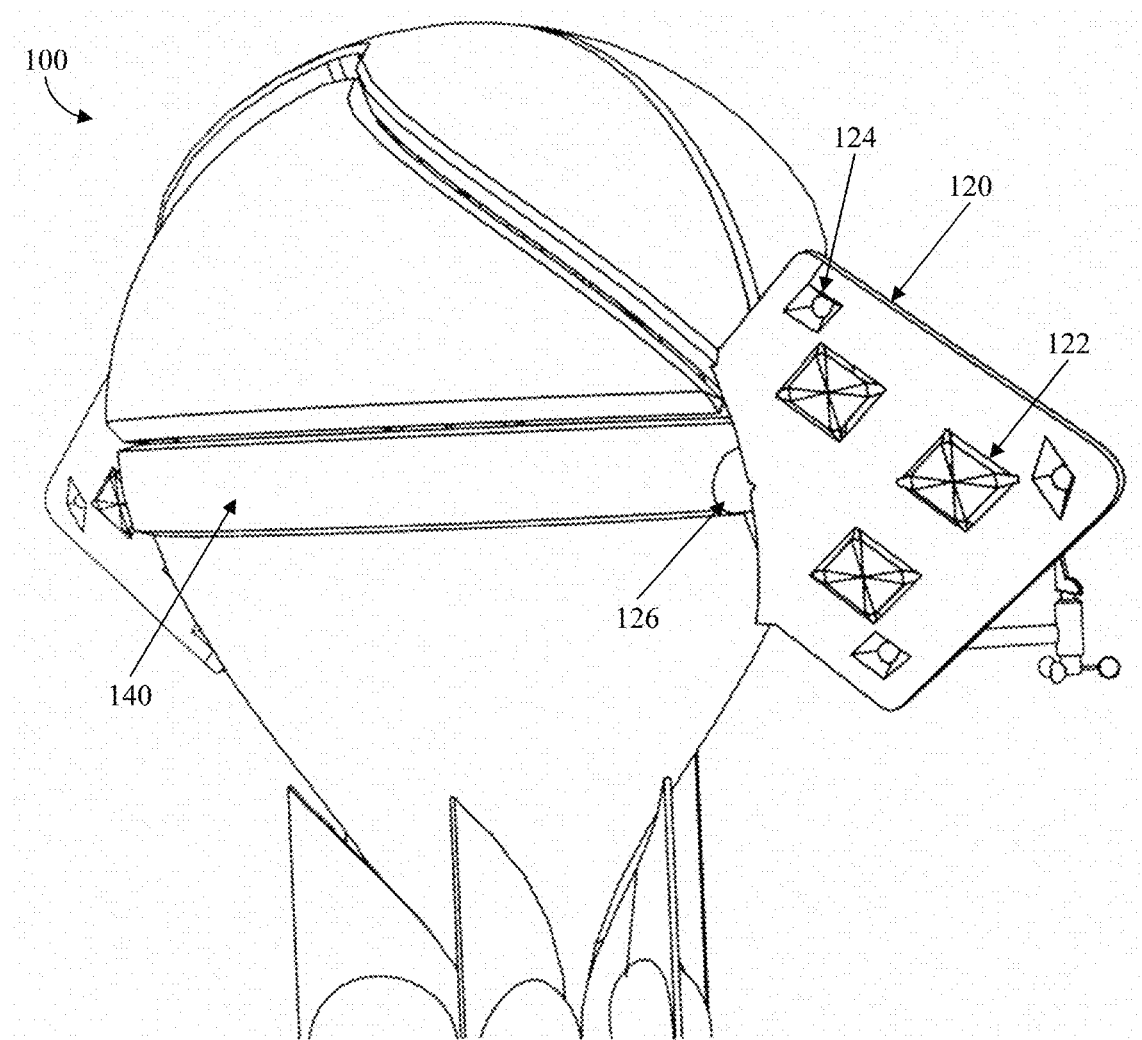
FIG. 3 shows side view of the drone charging lamp post.
Figure 4:
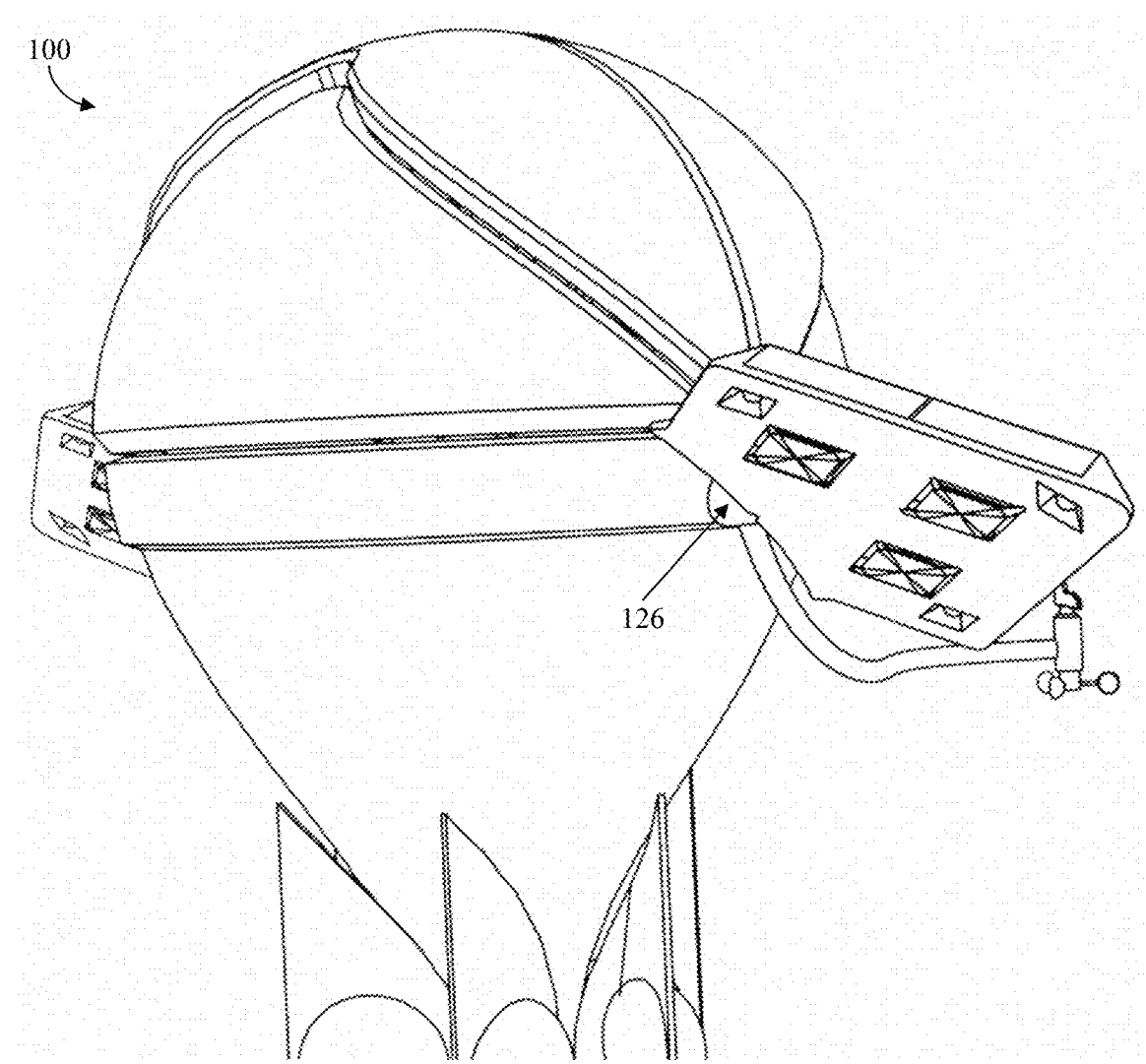
FIG. 4 shows another side view of the drone charging lamp post.
Figure 5:
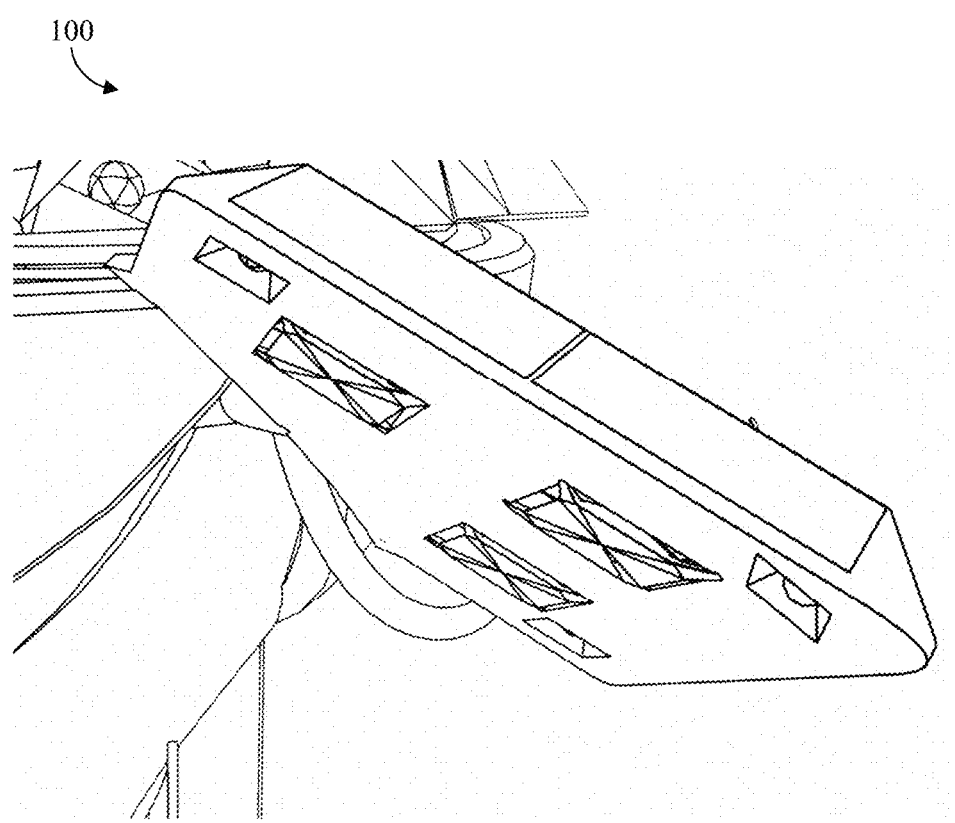
FIG. 5 shows a close-up view of the side rhombus of the drone charging lamp post.

FIGS. 1 and 2 top-down views of a drone charging lamp post 100. FIGS. 3 and 4 show side view of the drone charging lamp post 100. The bottom portion of side rhombuses 120 includes lighting elements 124 and dimples 122. The dimples 122 can produce additional wind canceling effects. The dimples 122 may also include openings to allow drainage of water which might be caught in the solar collecting features 122 (See FIG. 18). FIG. 5 shows a close-up view of the side rhombus 120 of the drone charging lamp post 100.

Figure 6:
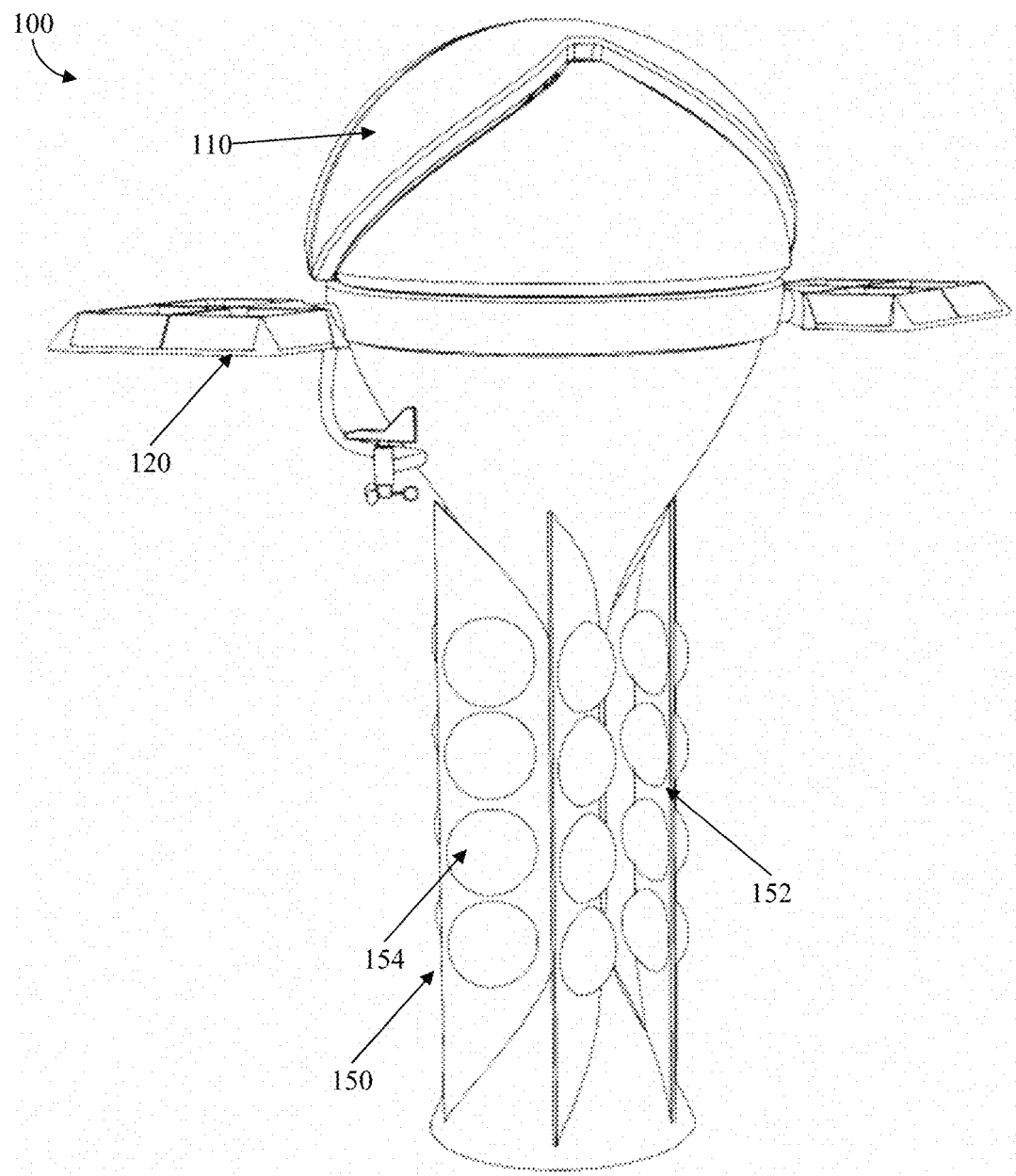
FIG. 6 shows a further side view of the drone charging lamp post.
Figure 7:
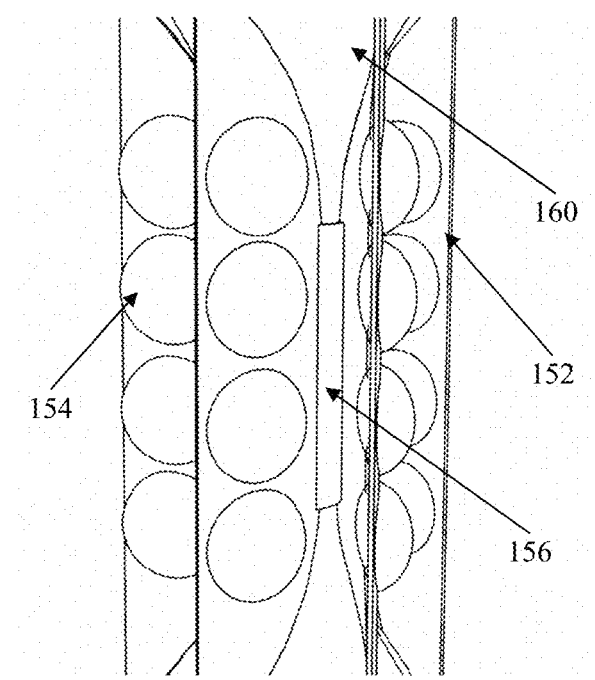
FIG. 7 shows a close-up view of the post of the drone charging lamp post.

FIG. 6 shows a further side view of the drone charging lamp post 100. The post portion 150 of the drone charging lamp post 100 includes turbine fins 152. As shown in FIG. 7, these fins 152 are connected to turbine hub 156. When exposed to the wind, the vertical turbine can spin around the post 160 in order to generate additional energy.

The turbine fins 152 may include dimples 156 and/or angled to better catch and direct wind. For example, the dimples 156 can help deflect the wind into the turbine in order to better spin the turbine fins 152.

Figure 8:
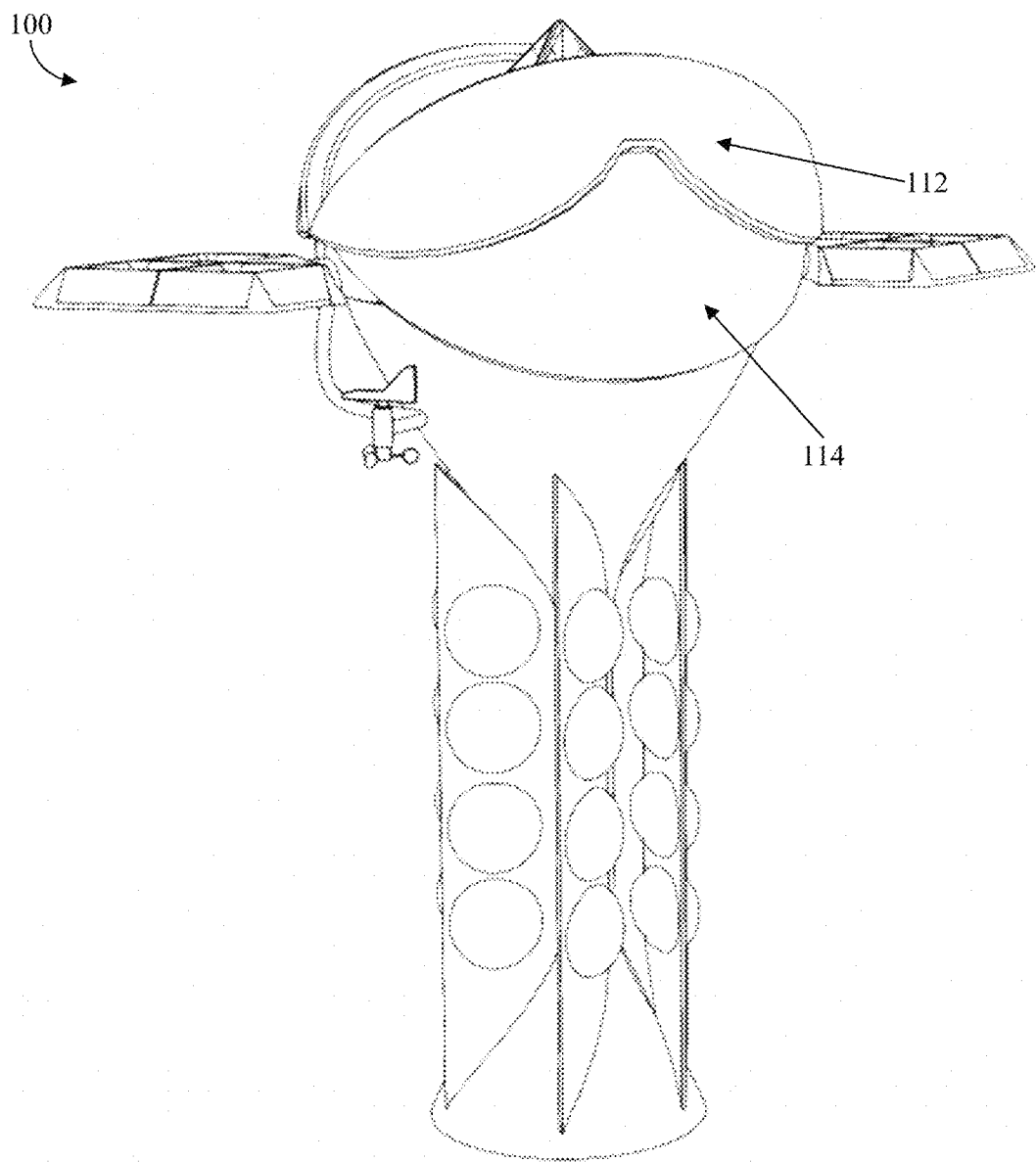
FIG. 8 shows a view of the cover of the drone charging lamp post opening.

FIG. 8 shows a view of the cover 110 of the drone charging lamp post 100 partially opened. The cover 110 includes an upper portion 112 and a lower portion 114. The upper portion 112 can slide down over the lower portion 114 which also sides down in order to open the outer shielding cover 110. The various portions 112, 114 of the cover 110 may be chrome plated on the interior side so as to reflect light back to the solar panels of the central pyramid 170 when opened.

In some non-limiting embodiments, the portions 112, 114 of the cover 110 may be translucent to incoming light, at least in some spectrums (such as IR), so as to allow solar panels of the central pyramid 170 to function even when the cover 110 is closed.

Figure 9:
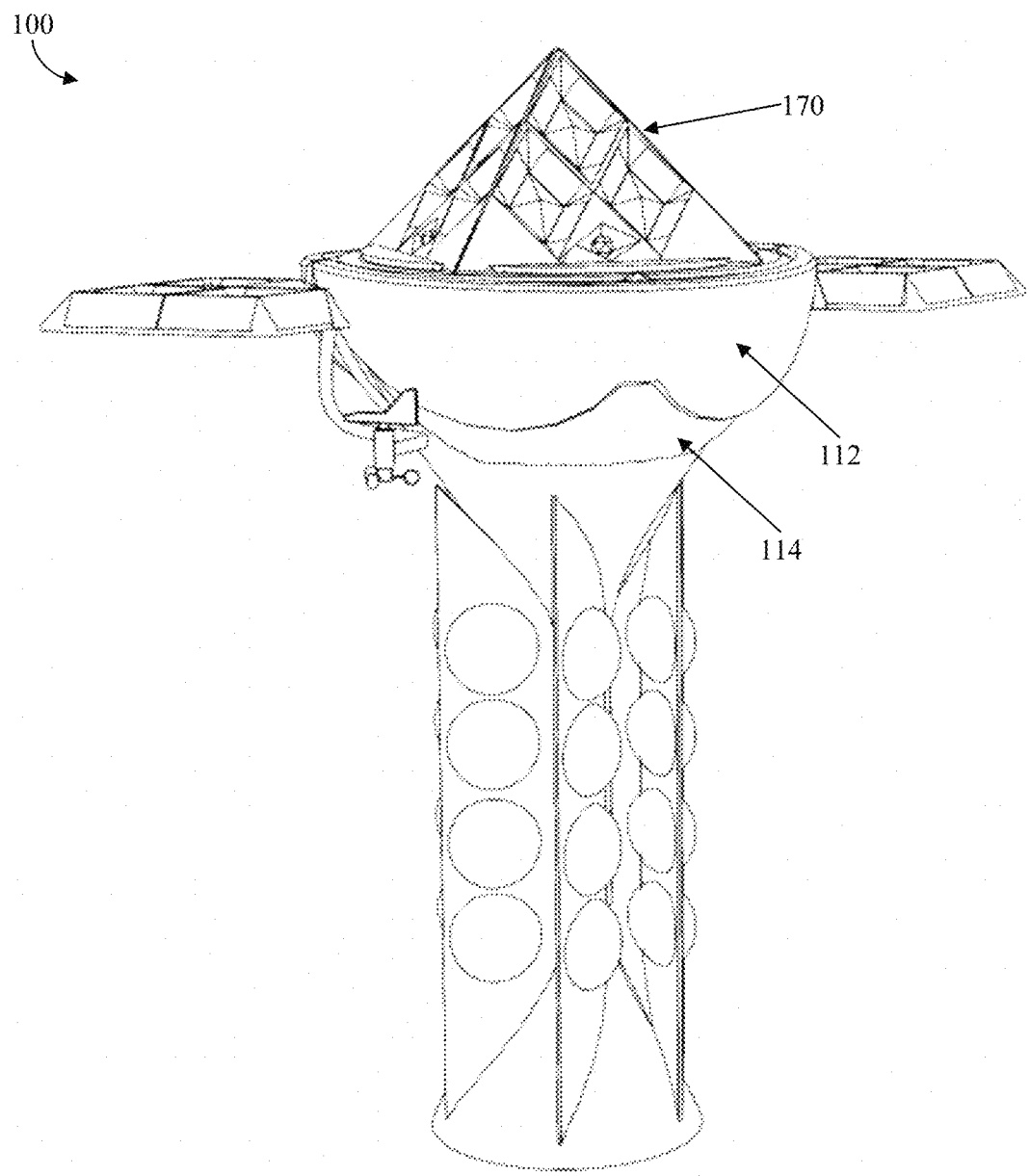
FIG. 9 shows a view of the of the drone charging lamp post with the cover opened.
Figure 10:
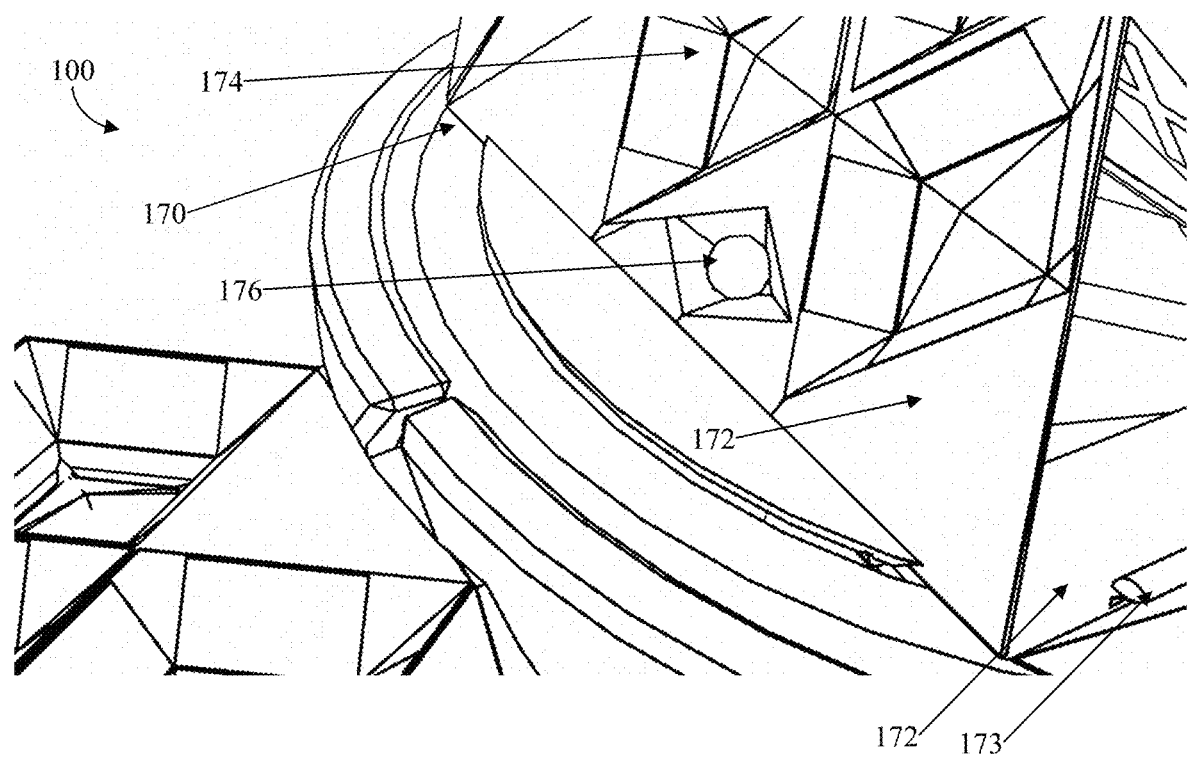
FIG. 10 shows a close-up view of the central pyramid of the drone charging lamp post.

FIG. 9 shows a view of the of the drone charging lamp post 100 with the cover 110 fully opened. Once opened, the cover 110 reveals the central pyramid 170. The central pyramid 170, shown in close-up in FIG. 10, features multiple petal 172 that can pivot around hinge 173. The petals 172 include solar panel sections 174 and lighting elements 176. In some non-limiting embodiments, the lighting elements 176 include infrared (IR) light emitting diodes (LEDs).

The cover 110 may be left open so as to better enable solar collection by the central pyramid 170. The lamp post 100 can also function as a landing site for drones. When functioning as a landing site, the central pyramid 170 may be opened in order to expose multiple landing platforms 180, 182.

Figure 11:
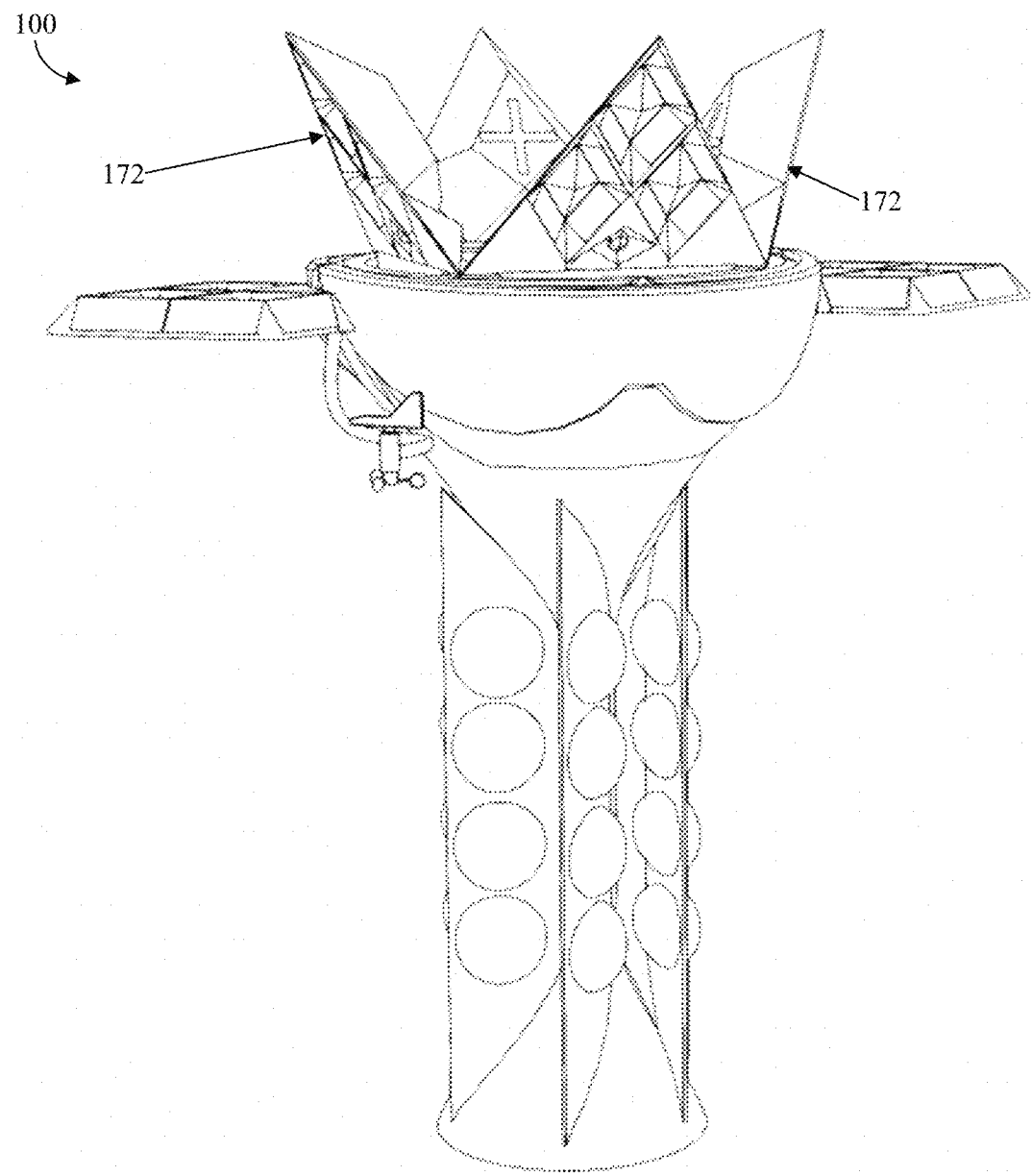
FIG. 11 shows a view of the pyramid of the drone charging lamp post opening.
Figure 12:
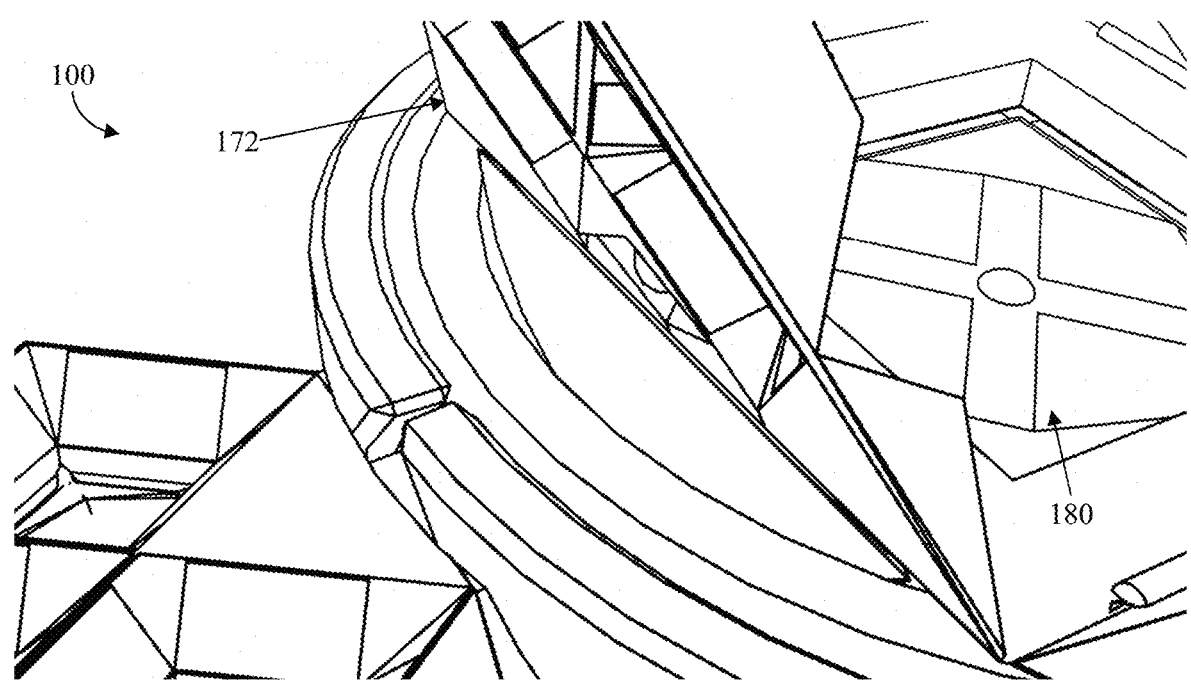
FIG. 12 shows a close-up view of the central pyramid of the drone charging lamp post opening.
Figure 13:
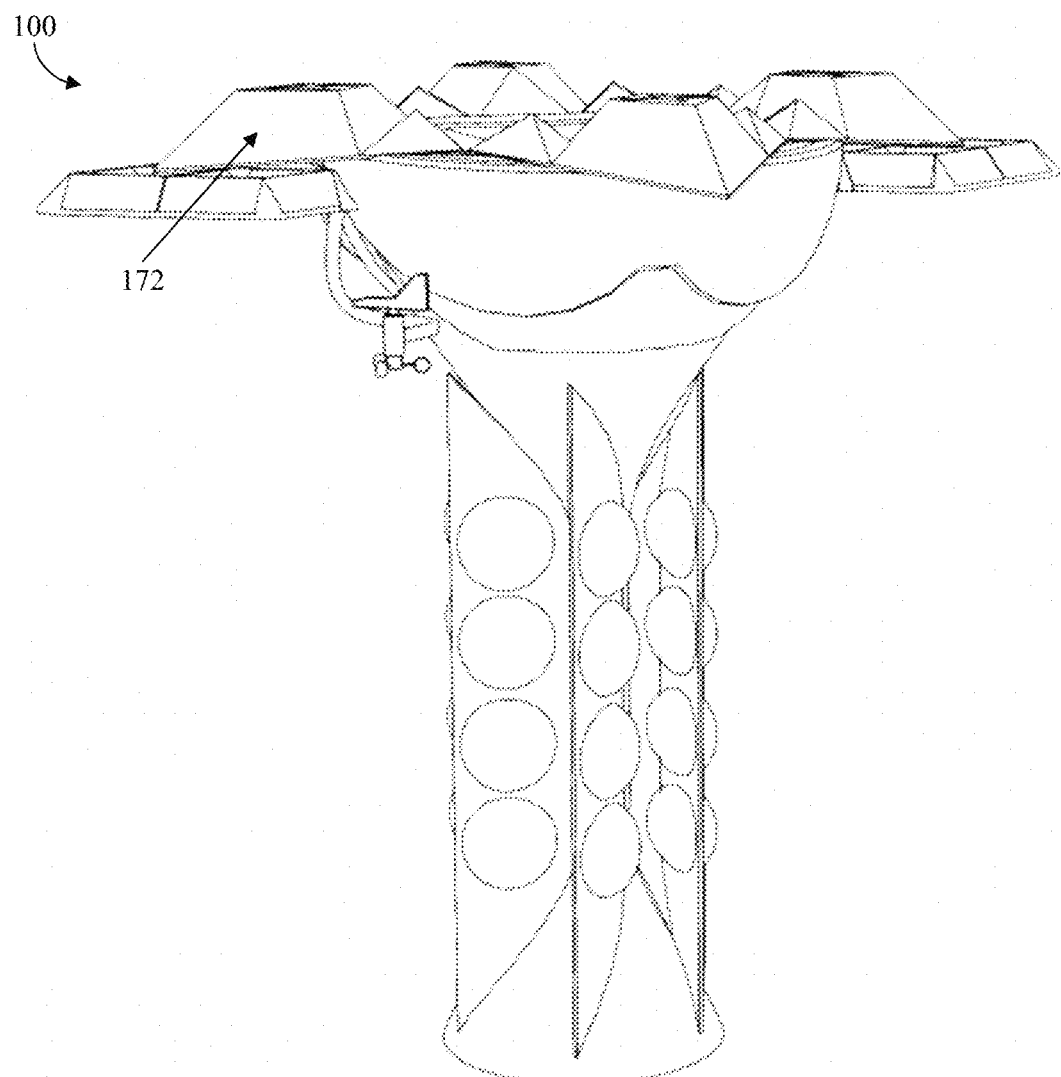
FIG. 13 shows a view of the central pyramid of the drone charging lamp post opened.
Figure 14:
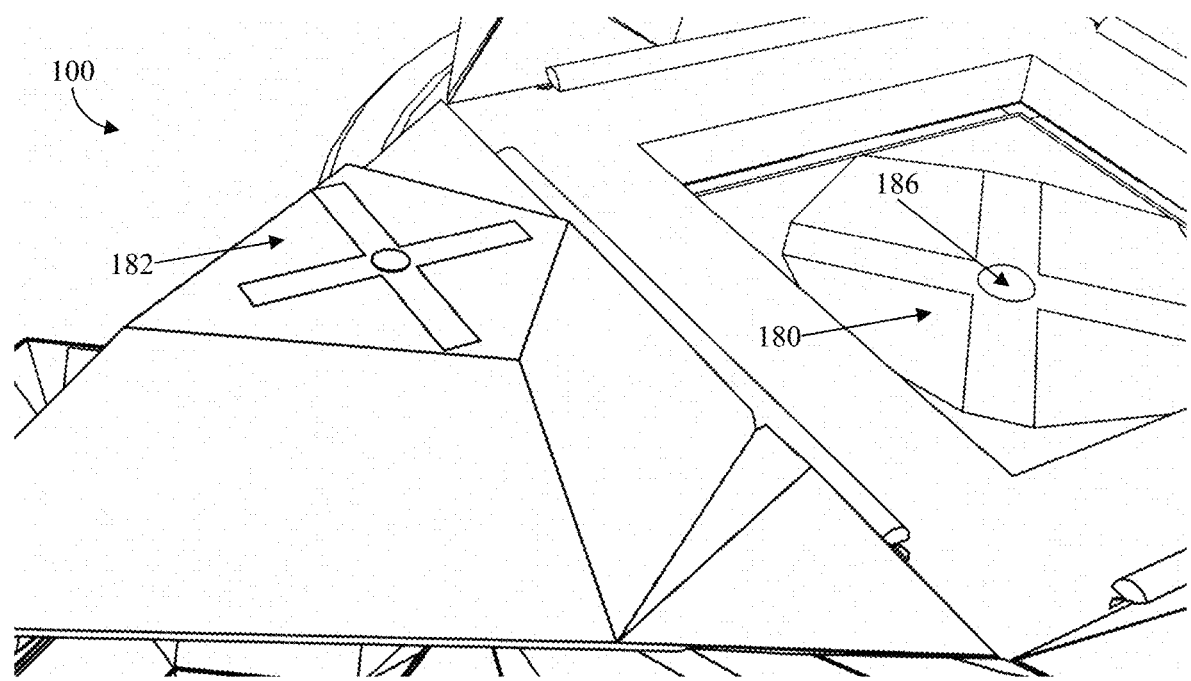
FIG. 14 shows a close-up view of the central pyramid of the drone charging lamp post opened.

FIGS. 11 and 12 show the pyramid 170 of the drone charging lamp post 100 being opened. As shown in FIGS. 13 and 14, once the central pyramid 170 of the drone charging lamp post 100 is opened a central landing platform 180 is exposed. Each petal 172 also includes landing platforms 182.

Figure 15:
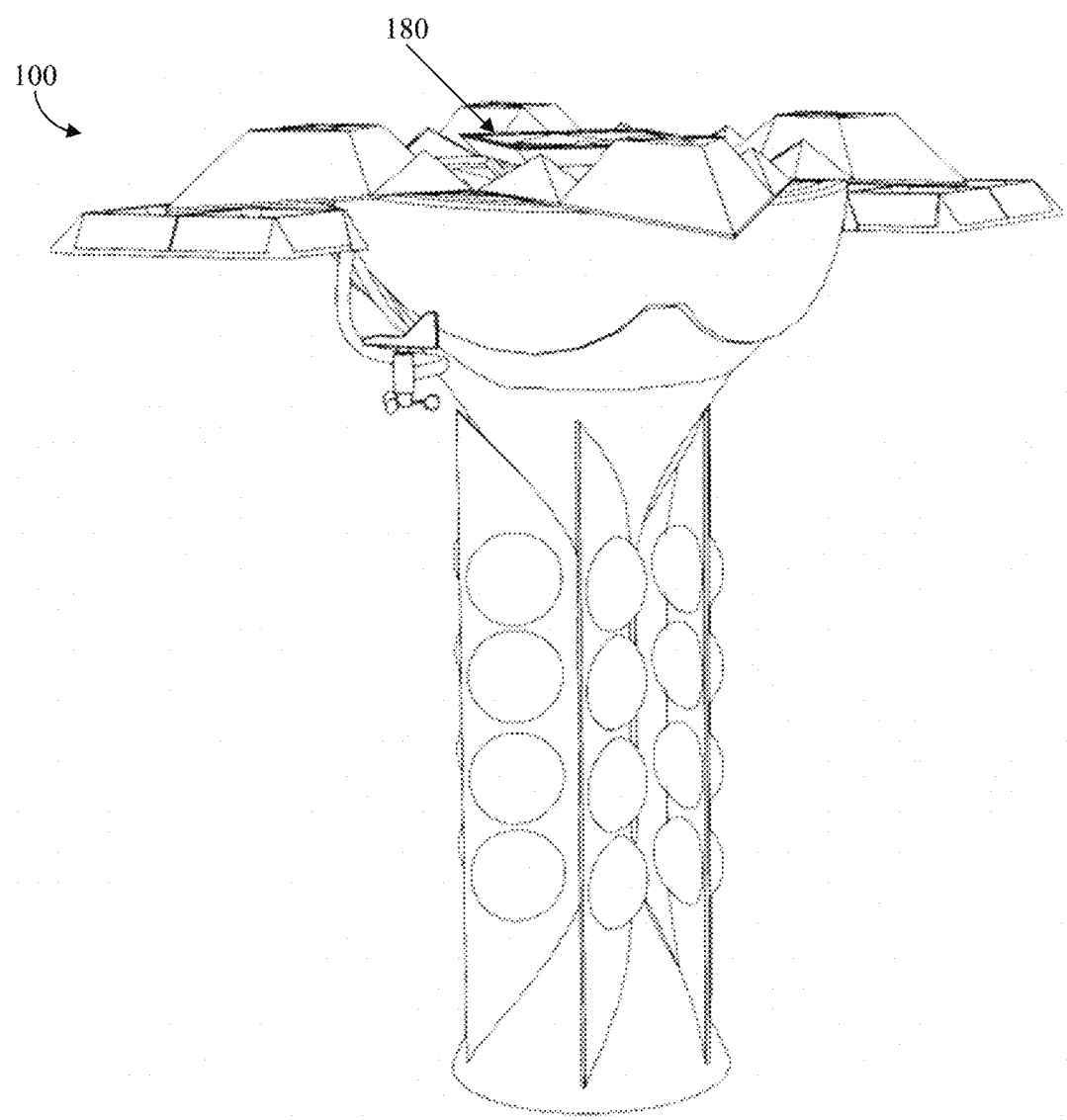
FIG. 15 shows a view of the central landing platform of the drone charging lamp post extending.
Figure 16:
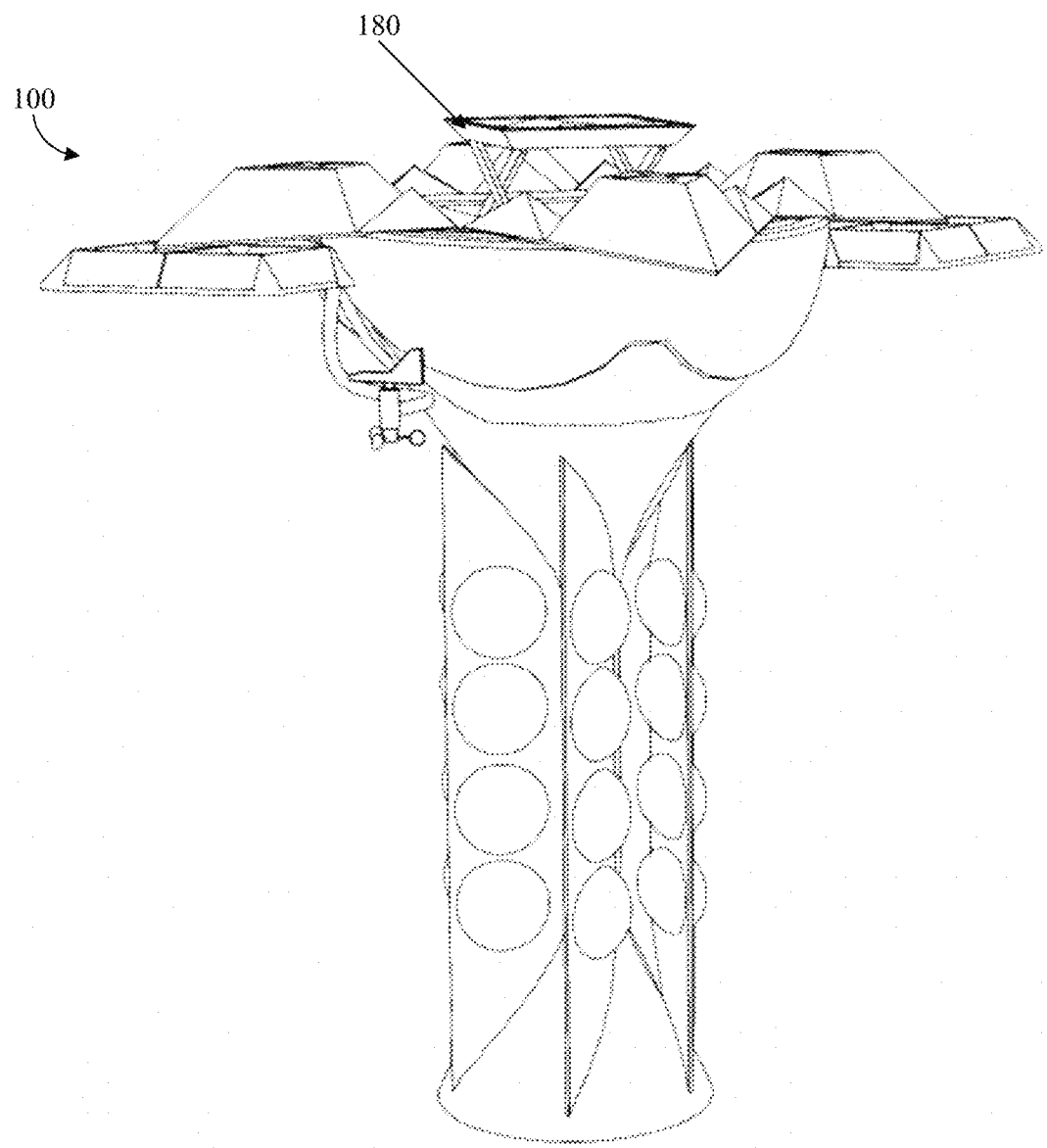
FIG. 16 shows a view of the central landing platform of the drone charging lamp post extended.
Figure 17:
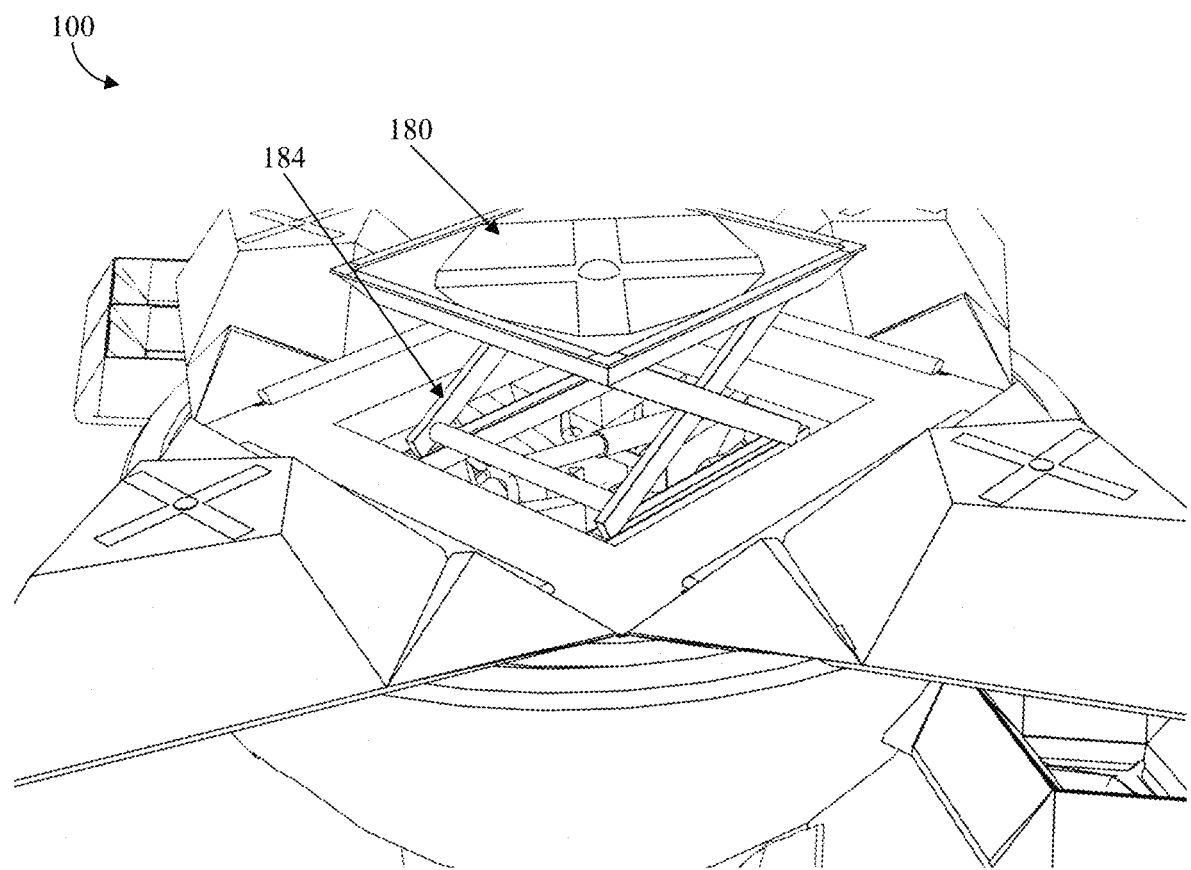
FIG. 17 shows a close-up view of the central landing platform of the drone charging lamp post extended.

FIG. 15 shows a view of the central landing platform 180 of the drone charging lamp post 100 being extended upward and FIG. 16 shows the central landing platform 180 extended. FIG. 17 shows the central landing platform 180 extended and lifting mechanisms 184 visible. In this non-limiting embodiment, the lifting mechanisms 184 is a scissor lift. In other embodiments, the lifting mechanism may be piston driven, or use telescoping columns on the corners of the pad. Each landing platform may include a locating device 186 such as an IR beacon.

Figure 18:
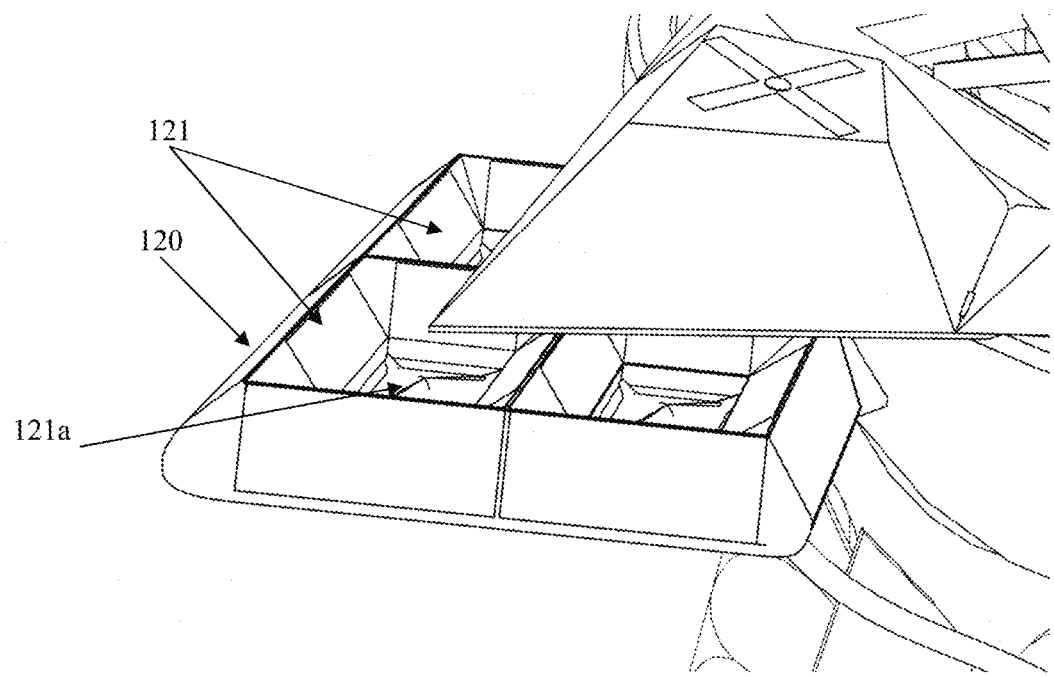
FIG. 18 shows a close-up view of one side rhombus of the drone charging lamp post while the central pyramid of the drone charging lamp post is opened.

FIG. 18 shows a close-up view of one side rhombus 120 of the drone charging lamp post 100 while the central pyramid 170 of the drone charging lamp post 100 is opened. The side rhombus 120 features various solar collecting sections 121. The solar collecting sections 121 may also include an opening 121a which allows water or other material to drain from the solar collecting sections 121. The sides of the solar collecting sections 121 may feature a reflective coating, such as chrome. When using solar panel 123 which respond well to IR, the coating may be a red chrome to further enhance this effect.

Figure 19:
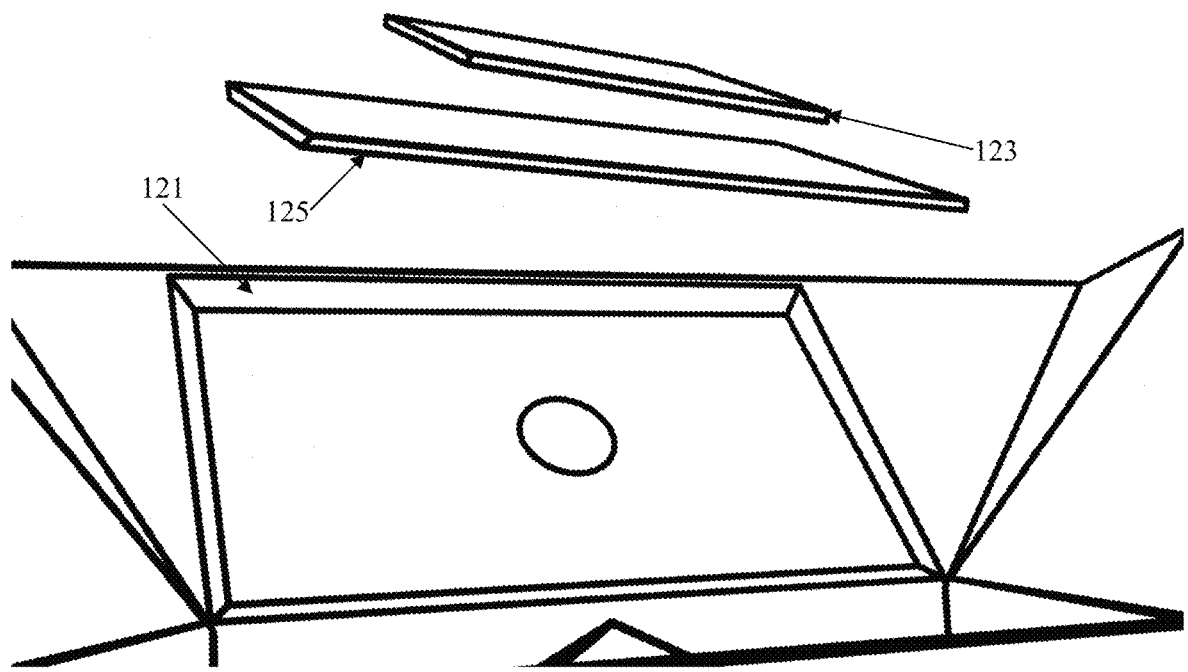
FIG. 19 shows an expanded, close-up view of the interior of a side rhombus of the drone charging lamp post.
Figure 20:
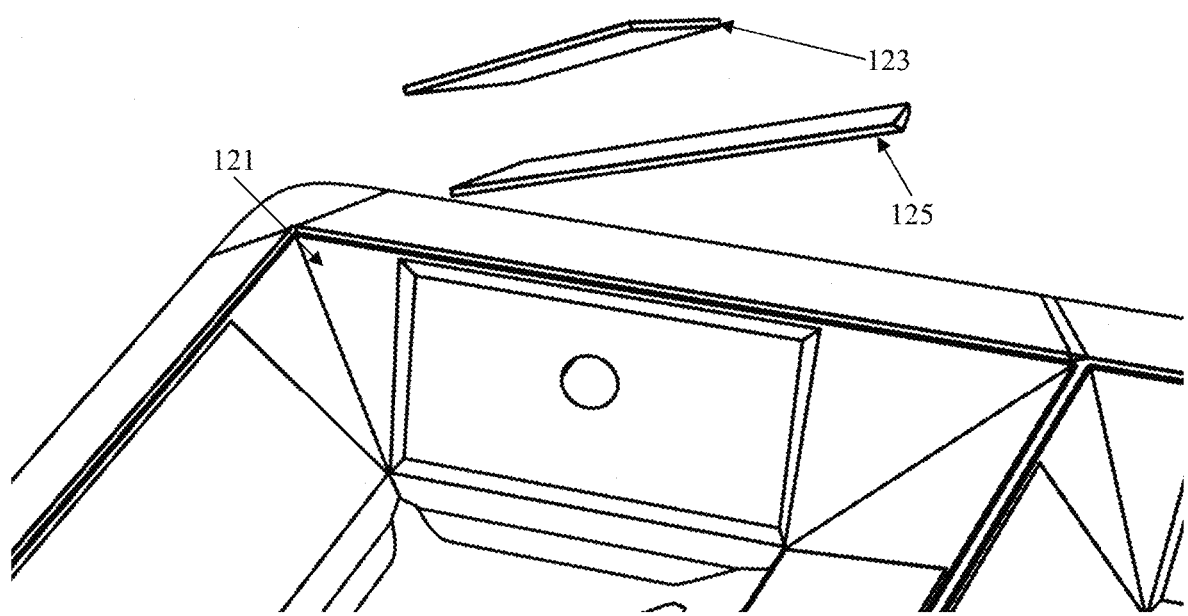
FIG. 20 shows another expanded, close-up view of the interior of a side rhombus of the drone charging lamp post.

FIGS. 19 and 20 show the interior of a side rhombus 120. The solar collecting section 121 includes solar panel 123 and acrylic sheet 125. These elements may be sandwiched together against the sides of the solar collecting sections 121. Light which enters between the sandwiched solar panels 123 may bounce around in the acrylic sheet 125 so as to be more fully collected.

Figure 21:
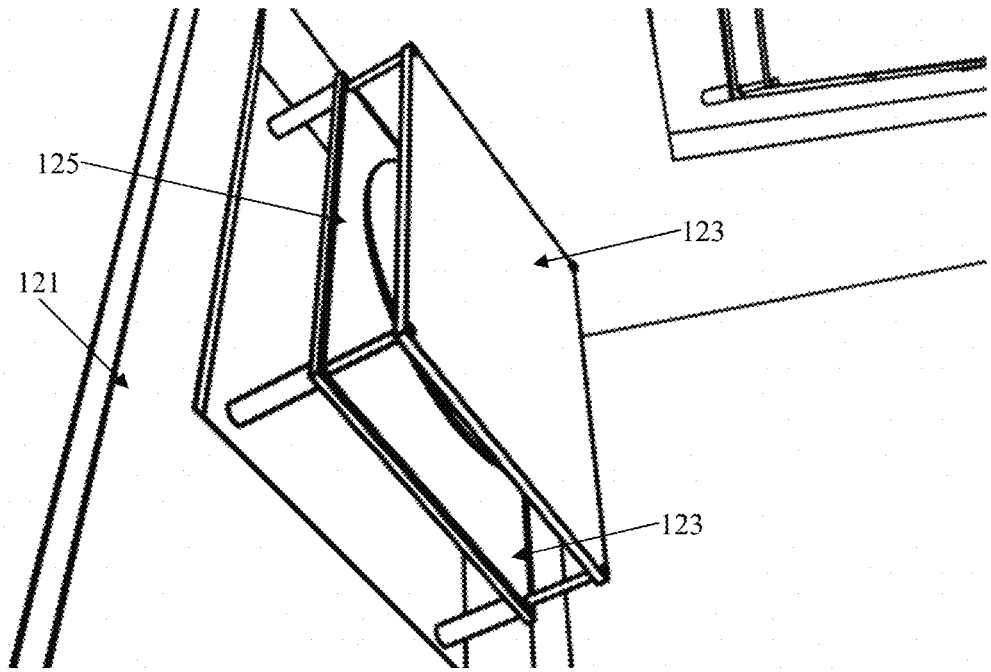
FIG. 21 shows a close-up of a solar charging element of the side rhombus of the drone charging lamp post.
Figure 22A:
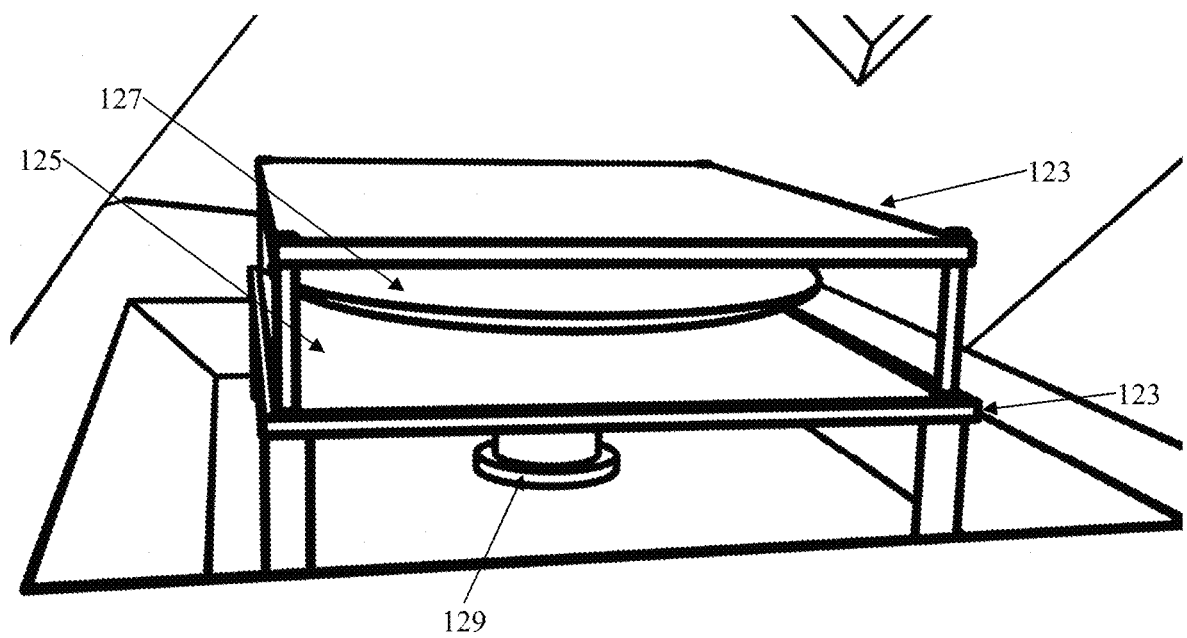
FIG. 22A shows another solar charging element of the side rhombus of the drone charging lamp post.

FIGS. 21 and 22A show a close-up of a solar charging element of the side rhombus 120. As shown, the solar charging element includes two solar panels 123 with an acrylic layer 125 between them. The acrylic layer 125 may also include a solar reflecting disc 127 which reflects light within the acrylic layer 125 onto the two solar panels 123. Power collected by the two solar panels 123 is transmitted through post 129.

Figure 22B:
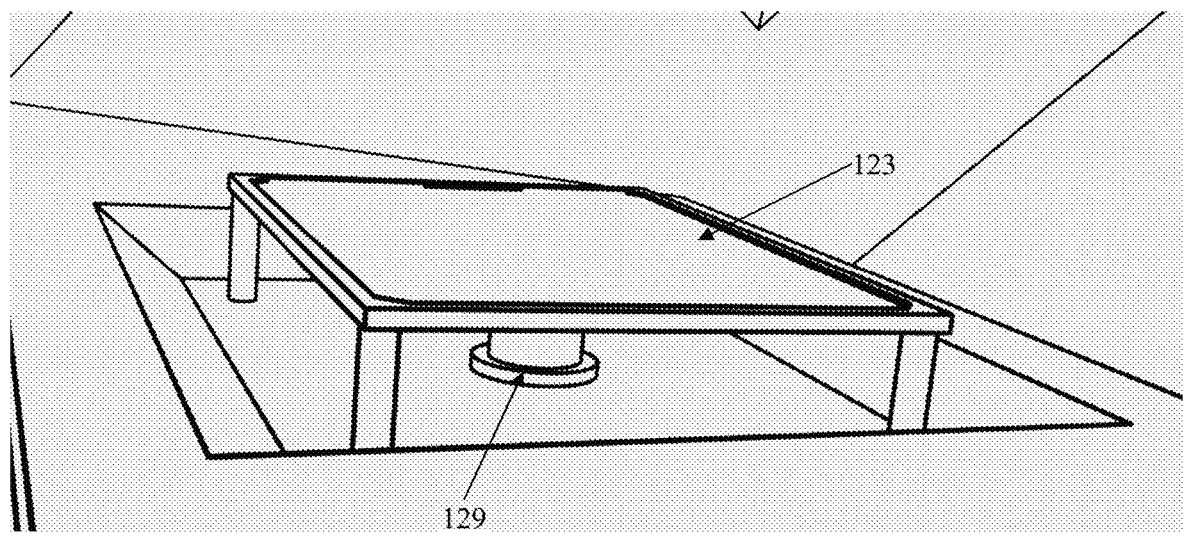
FIG. 22B shows a single panel solar charging element of a side rhombus of the drone charging lamp post.
Figure 23:
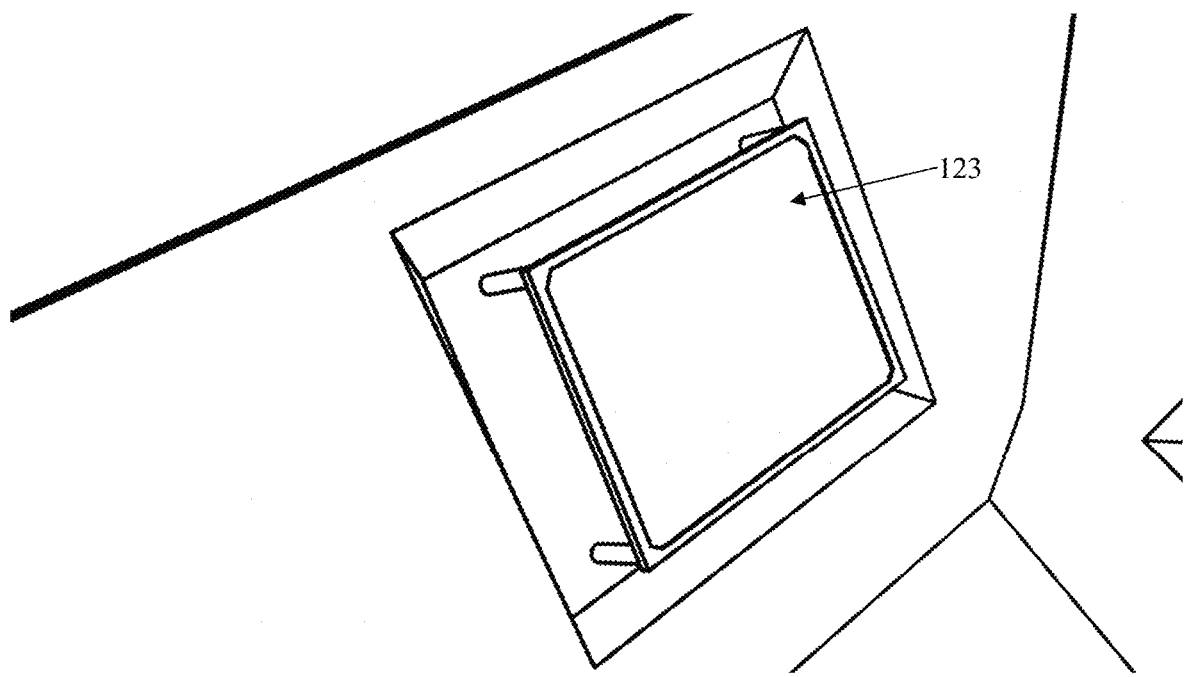
FIG. 23 shows another view of the single panel solar charging element of the side rhombus of the drone charging lamp post.

FIGS. 22B and 23 show an alternative single panel solar charging element which includes solar panels 123 and post 129.

Figure 24:
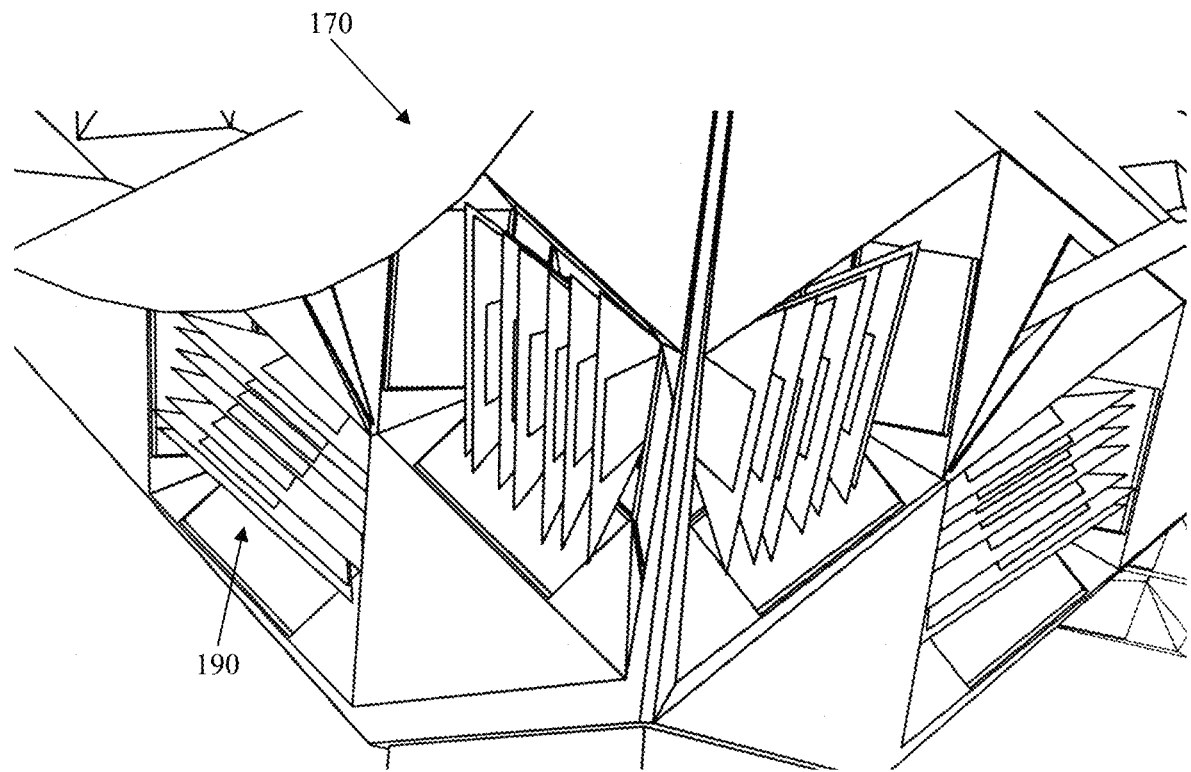
FIG. 24 shows solar cell broom arrays on the bottom of the central pyramid of the drone charging lamp post.

FIG. 24 shows solar cell broom arrays 190 underneath the central pyramid 170 of the drone charging lamp post 100. See FIGS. 32-52 for further detail regarding the broom arrays.

Figure 25:
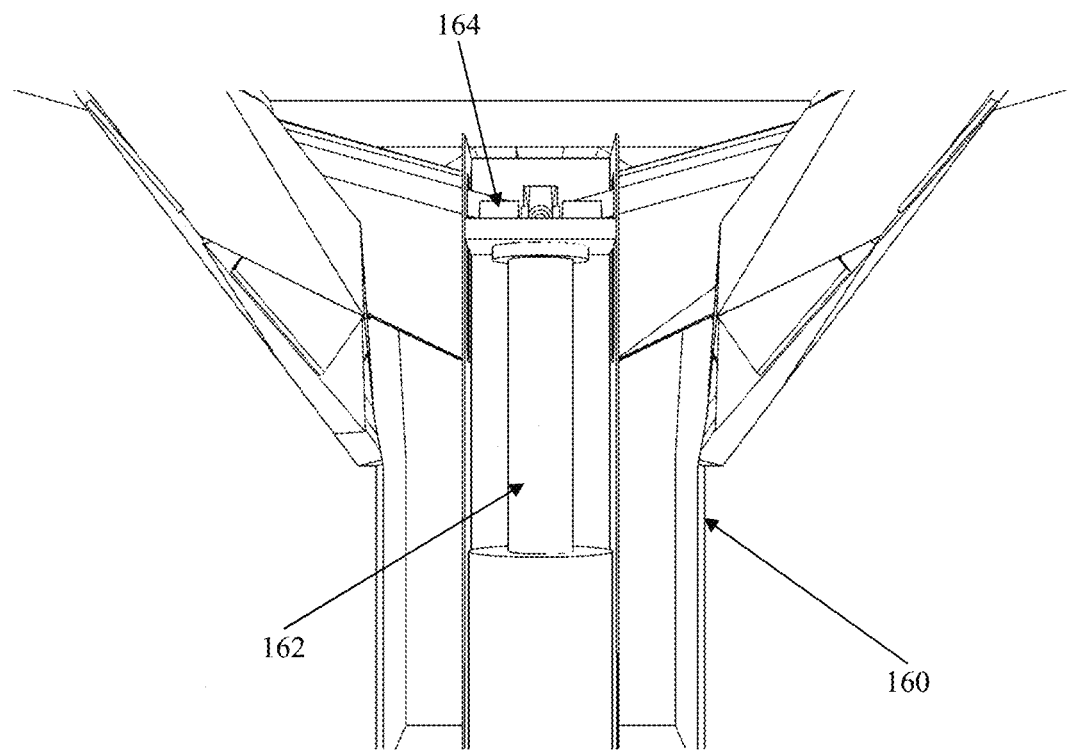
FIG. 25 shows a cut-away view of the petal opening mechanism of the drone charging lamp post.
Figure 26:
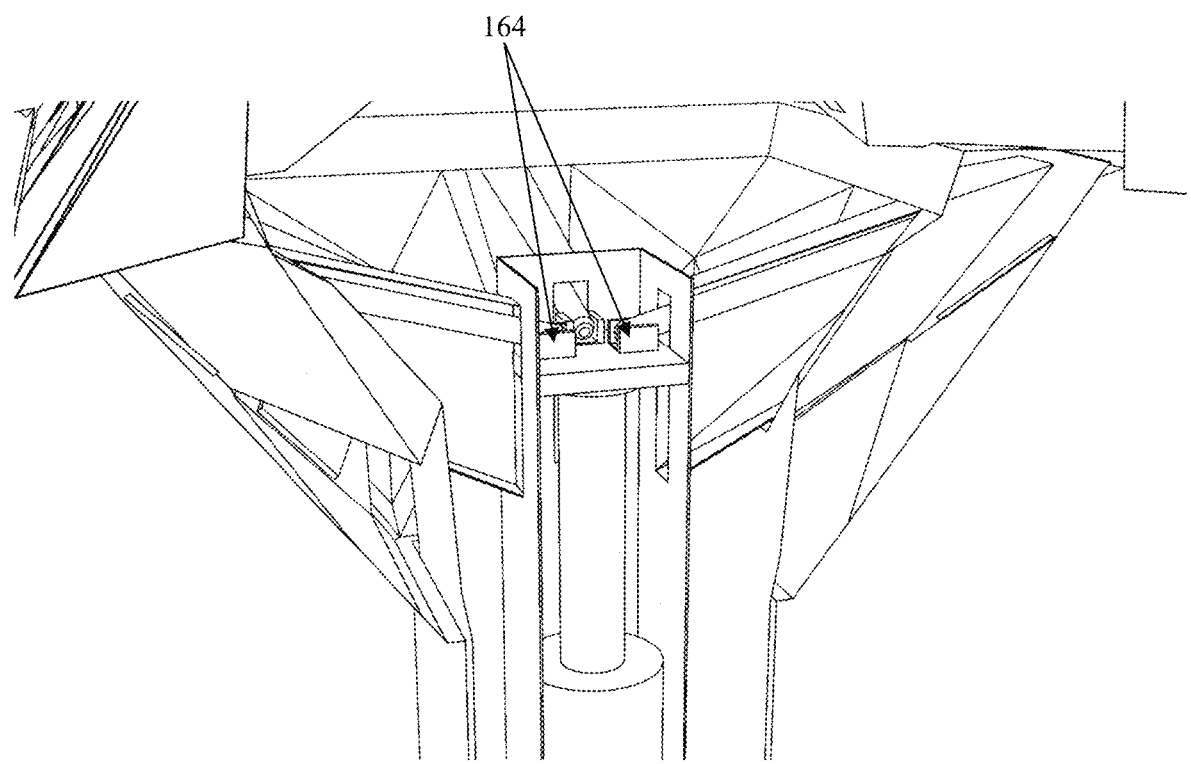
FIG. 26 shows another cut-away view of the petal opening mechanism of the drone charging lamp post.

FIGS. 25 and 26 show a petal opening mechanism 162 of the drone charging lamp post 100. As shown, the petal opening mechanism 162 includes a central piston 162. When the piston is raised, extensions 164 of each petal are pushed outward so that the associated petal 172 is lowered into the open position. When the piston 162 is lowered, the extensions 164 are pulled inward and down so that the associated petals 172 are raised and close the central pyramid 170.

The landing pads 180, 182 can be a multi-layered construction. The top layer can feature a thin layer of an impact resistance material, similar to a mouse pad, or a rubber layer. A pair of small magnetic connections for DC charging may penetrate the top layer. The central landing platform 180 can be extended upward from the open PWS to minimize the chance of damaging the outer sections.

Under the landing pads 180, 182, there may be a system of induction coils to allow for wireless charging of the drone using AC current.

The landing pads 180, 182 may also have a pair of direct connection points, one of which is positive and on which is negative. When a drone lands, the magnetic pads will connect the pad to the drone. This will provide a "hard wire" connection that will allow DC charging directly to the battery system of the drone.

If AC power is required by the drones charging systems, that can be achieved via a wireless connection. Wireless charging can be done by either providing AC to an inductive charging coil or by having the DC feed go to a coil in the landing pads 180, 182 and then having the coil create the needed electromagnetic flux in a corresponding coil attached to the drone.

A logic controller/small computer may be located in the PWS which can recognize which type of charging the drone uses, and then turn on the associated system, so that both are not powered at the same time, so as to improve efficiency and also prevent interference.

The charging system can also be setup to be linked primarily to the batteries of the lamp post to provide a constant flow of power, rather than to the solar cells of the PWS which may not produce a constant flow at all time.

On the drone side, there are multiple possible varieties depending on the drone. There can be a wireless only system, which can receive the wireless charging. There may be a wired only system, which uses the direct connections, but doesn't have the wireless capability. Alternatively, there may be a hybrid system which can handle both but this may be heavier than either dedicated system.

Various embodiment provide a solar street light using the PWS. The top portion has four sides that form a pyramid, each side using multiple inverted diamonds, or rhombuses, that are part of the PWS design (which uses solar cells on the inside surfaces of each of the rhombuses in a fashion to generate solar power). The portion of the assembly below the top pyramid shaped structure includes the lights for the street light, battery storage, electronics, controls and wiring, as well as the mechanical and electrical components that provide the ability for the four sides of the top pyramid portion to open up (like a flower opening its pedals), exposing landing areas for drones to land on for subsequent charging.

There may be a landing/docking station for a single drone in the center of the opened assembly, as well as an additional landing/docking station on the outer "tip" or point of each of the four opened pyramid wall sides, thus allowing for a total of five drones to land and be charging at the same time on the opened assembly. Each drone can dock via a method of homing in on and landing on an available open docking area. This process could use a laser mounted as part of the drone or other automated method of detecting which of the five docking areas is available and then moving to and landing (via the drone's tracking system) on that open docking/charging location. This process of a drone finding and being guided to land on an open docking location on the open street light assembly could also include a tracking or guidance system that is part of the street light assembly.

The drone landing system may be thought of as divided into two main components: a drone side and a pad side.

The drone side system includes a small transmitter that can request landing from the pad. It also has a software component that can identify the correct orientation on the pad to allow for maximum charging efficiency and confirm that connections are good. This may be achieved by using the camera on the drone and a set of lights on the pad.

The pad side features a set of landing lights that can turn on whenever the PWS is open. This helps drones to land safely and with the correct orientation on the pad to allow the connections to be made. The Pad may also recognize when a drone is landed, so that it can retract into the PWS.

The lights may be visible lights or use non-visible light, such as IR or UV. When a drone approaches a solar street light assembly 2700, the drone uses a tracking/guidance system to let the street light assembly know it's approaching as well as to detect an available landing/docking location. Once the drone detects open docking area location for charging, it guides itself in for landing. The four sides 2720 of the top pyramid section of the light assembly have opened up to expose five individual docking/charging station locations for up to five drones.

Figure 27:
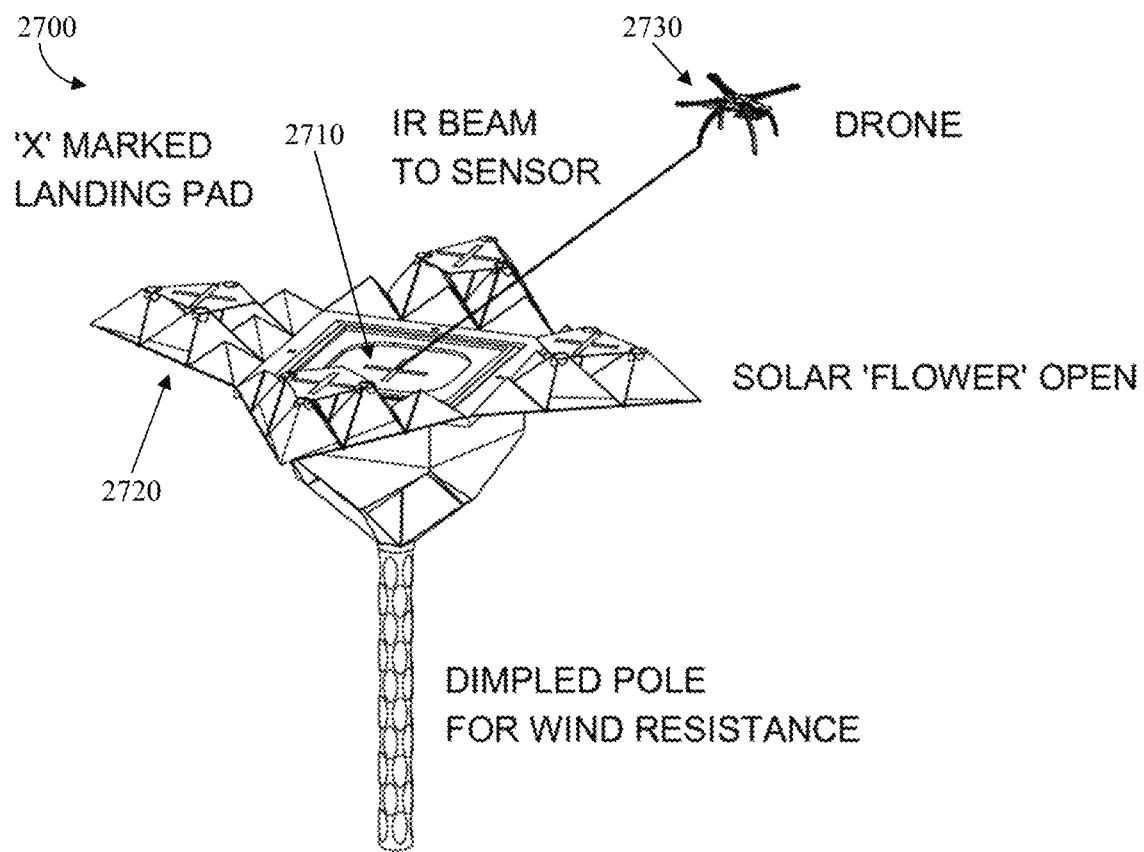
FIG. 27 shows a drone approaching the drone charging lamp post in order to land.
Figure 28:
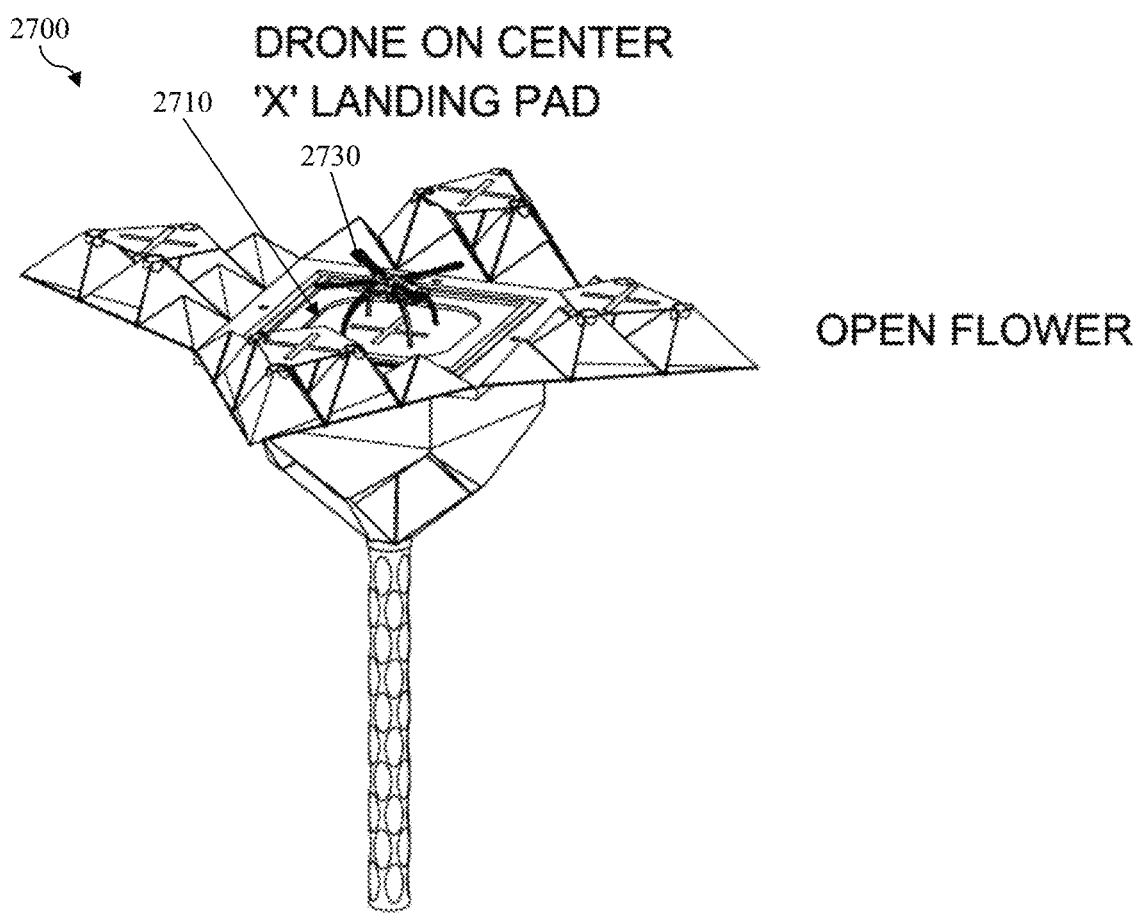
FIG. 28 shows the drone having landed on the drone charging lamp post.

FIG. 27 shows a drone 2730 approaching the drone charging lamp post 2700 with petals 2720 opened in order to land. The drone 2730 uses an IR beam to sense the landing pad 2710. FIG. 28 shows the drone 2730 having landed on the drone charging lamp post 2700.

Once landed, the pad can determine if the drone that has landed is to be charged via the wired system or a wireless charging system. The drone charging time and/or amount of charging performed can be monitored and thus charged to the customer (for payment or collection). Each drone can simply undock and fly away at some point following completion of its desired charge.

Once the first drone 2730 is docked for charging and/or storage, the drone 2730 can be secured in position. Up to four other drones can also then be guided in or guide themselves in to find an open docking station location and then dock for charging.

Figure 29:
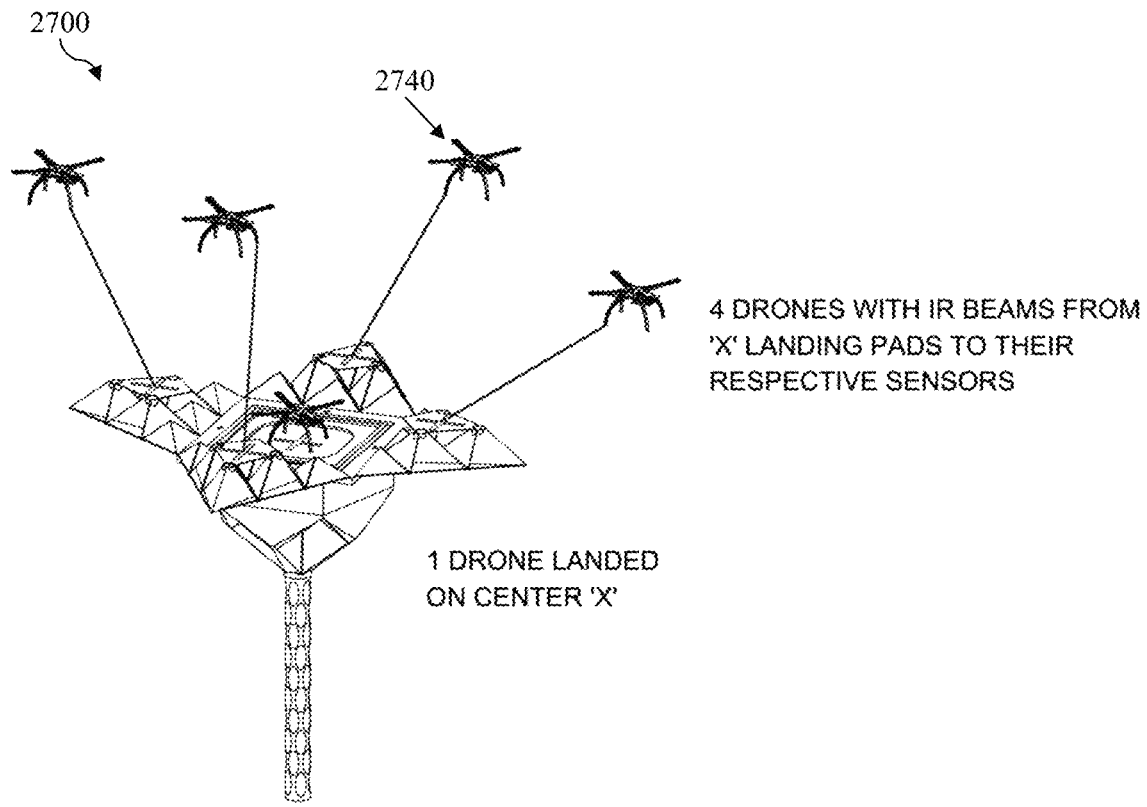
FIG. 29 shows additional drones approaching the drone charging lamp post in order to land.
Figure 30:
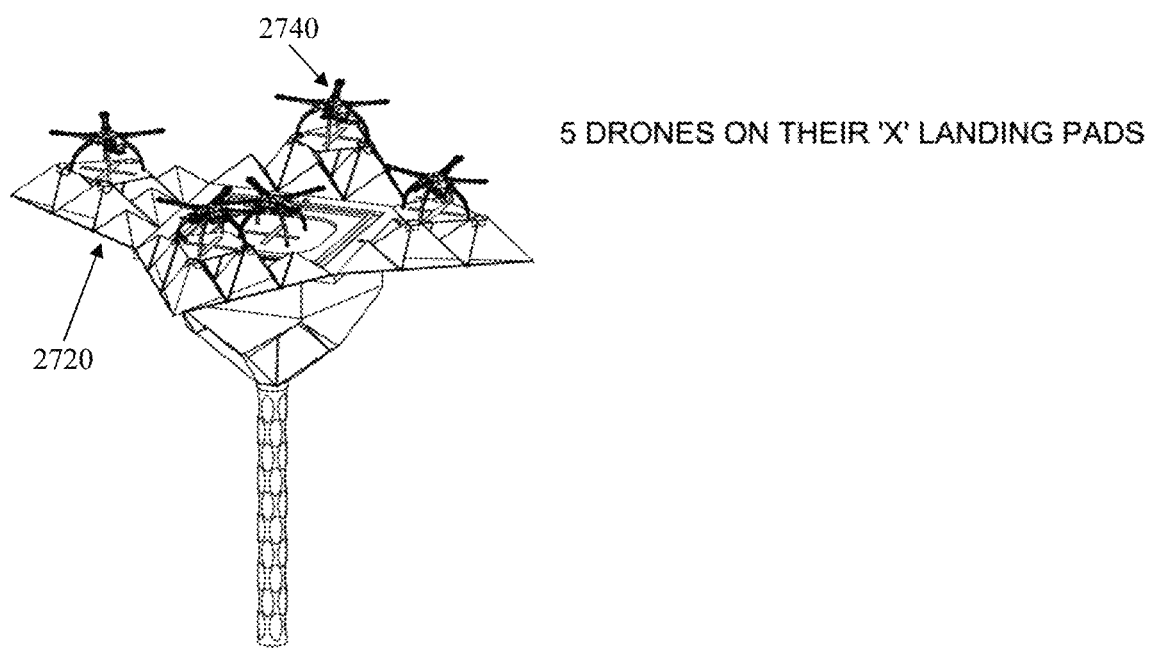
FIG. 30 shows the additional drones having landed on the drone charging lamp post.

FIG. 29 shows additional drones 2740 approaching the drone charging lamp post 2700 in order to land. Each of these drones 2740 can also use IR beams to sense their associated landing pads on the petals 2720. FIG. 30 shows the additional drones 2740 having landed on the drone charging lamp post 2700.

A single drone may remain within the solar street light assembly with the four sides of the pyramid assembly closing up to provide a weather tight enclosure for the drone to perform or complete its charging and/or for a weather tight storage area for the single drone.

Figure 31:
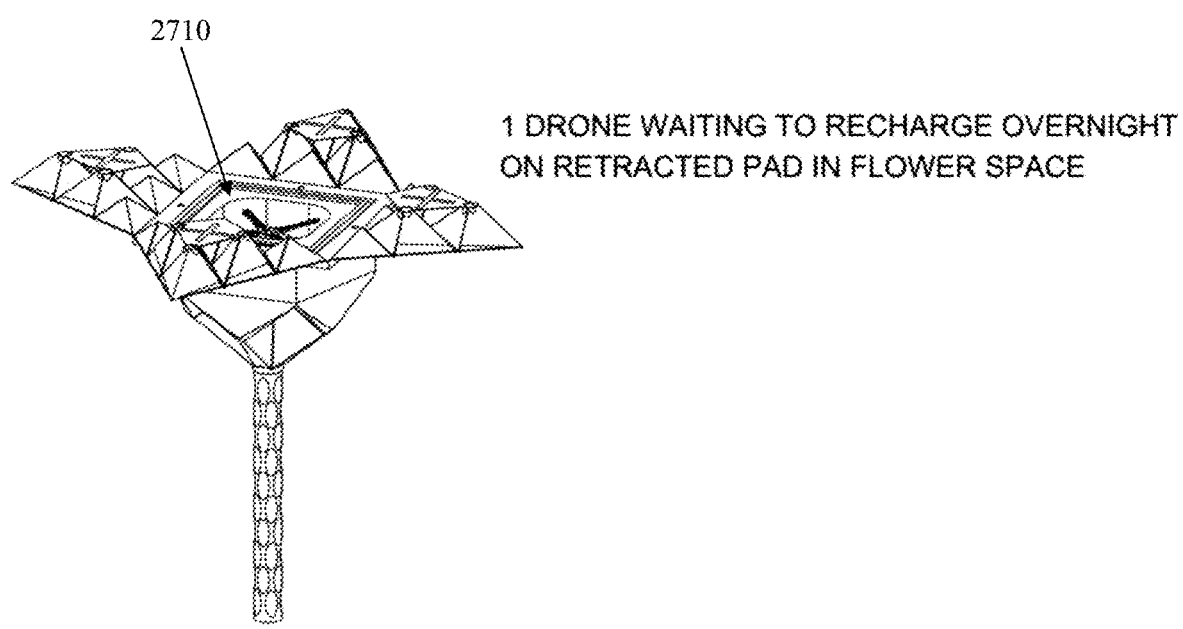
FIG. 31 shows a drone on the central landing platform being lowered into the drone charging lamp post.

FIG. 31 shows a drone 2730 on the central landing platform 2710 being lowered into the drone charging lamp post 2700. Once lowered, the petals 2720 may be closed up. This allows the assembly to reform the top pyramid shape to either allow a single drone to keep charging and perform its charging operation while enclosed within the weather tight pyramid structure or simply as a weather tight storage location for the single drone until it is time for the drone to leave the assembly.

The solar street light can reopen when it is time for the single drone to leave the assembly, or when it is desired for other drones to land and charge on the other four docking/charging locations available when the light assembly is fully open again.

Various embodiment provide a solar street light/lamp using aspects of the PWS. The top portion has solar arrays which fit a four sided cavity that form an inverted pyramid, each side using multiple inverted diamonds, or rhombuses, that are part of the PWS (which uses solar cells on the inside surfaces of each of the Rhombuses in a fashion to generate solar power). The portion of the assembly below the top structure includes the lights for the street light, battery storage, electronics, controls and wiring, as well as any mechanical and electrical components that provide the ability for the top pyramid portion to move, tilt, rotate or even open up (like a flower opening its pedals), exposing additional surfaces.

Figure 32:
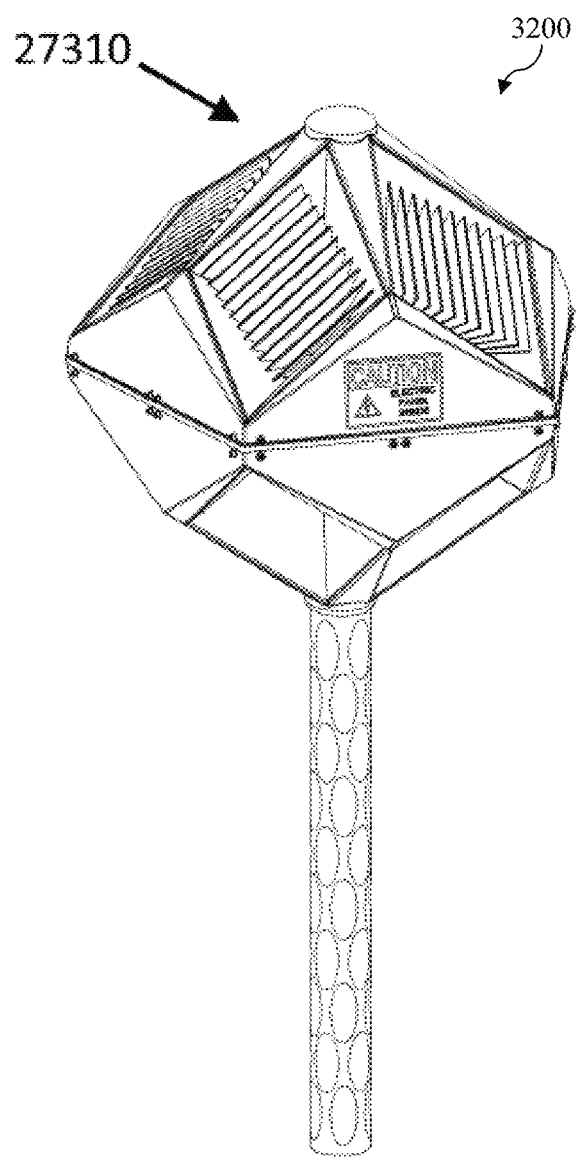
FIG. 32 shows a lamp post having solar cell broom arrays.

FIG. 32 shows a lamp post 3200 having solar cell broom arrays 27310. Rhombus based pyramid cavities are disposed in a star shaped fashion, top and bottom, around a pole. At the top, each of these cavities are several pairs of solar panels, bonded back to back and arranged in a radial array (or broom arrays) 27310 secured into the inverted apex of their respective pyramid.

Figure 33:
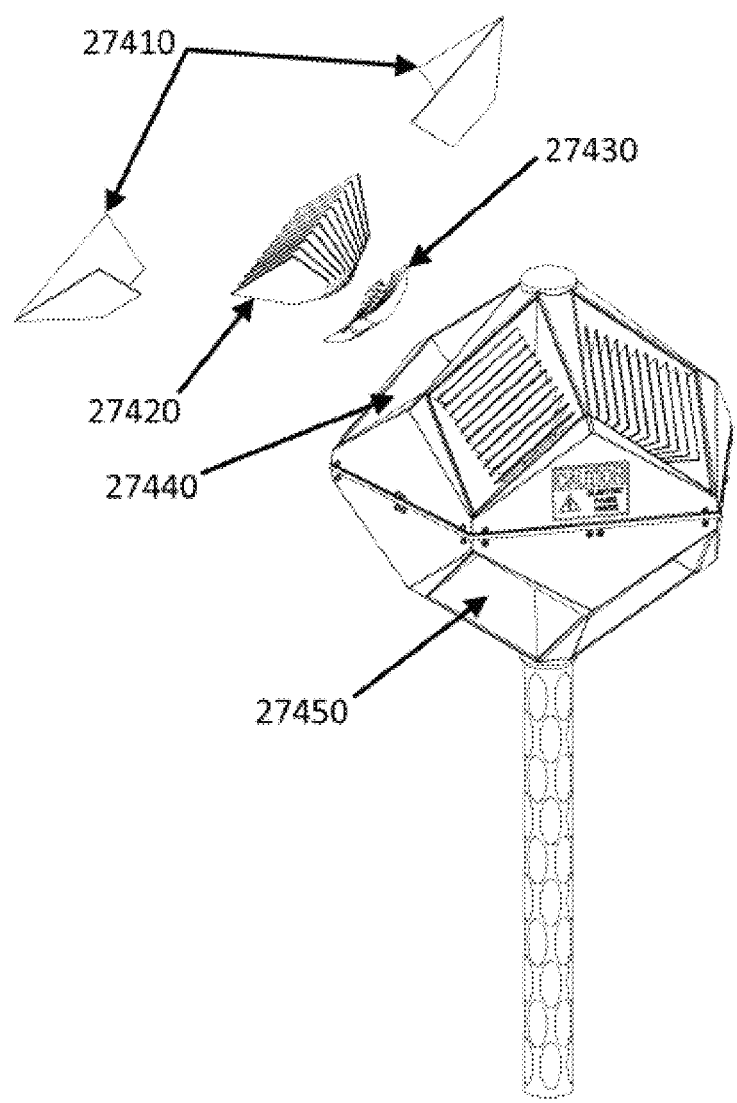
FIG. 33 shows an expanded solar cell broom array of the lamp post.

FIG. 33 shows an expanded solar cell broom array 27310 of the lamp post 3200. The inside wall of each of these pyramids has a mirrored plate for solar panels 27410 bonded to it. Back-to-back or sandwiched "Broom" shaped solar cells 27420 are aligned in a fan-shaped configuration and secured into a socket housing 27430. Each combined solar cell configuration, mirrors and housing is secured in their respective inverted pyramid housing 27440. Directly below each solar cell configuration is a lighting configuration secured in its light pyramid housing 27450.

Figure 34:
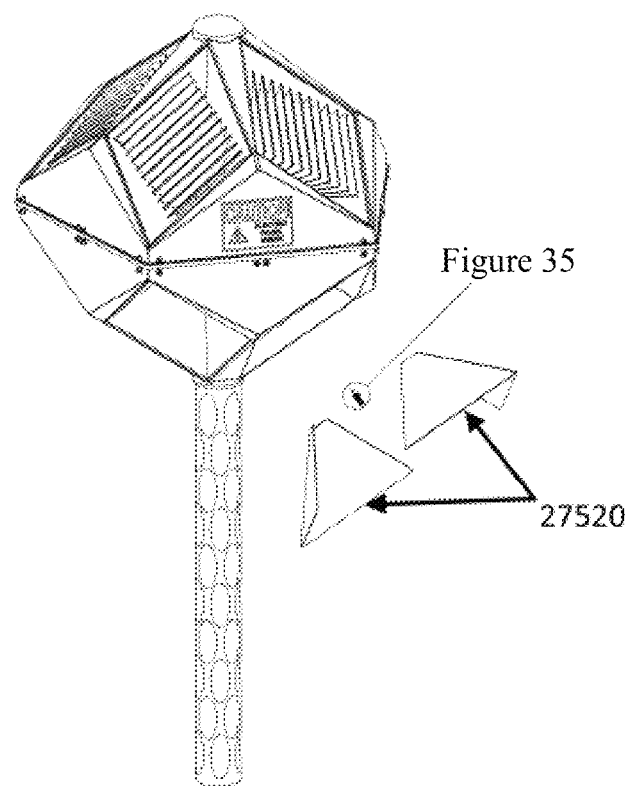
FIG. 34 shows an expanded lighting element of the lamp post.
Figure 35:
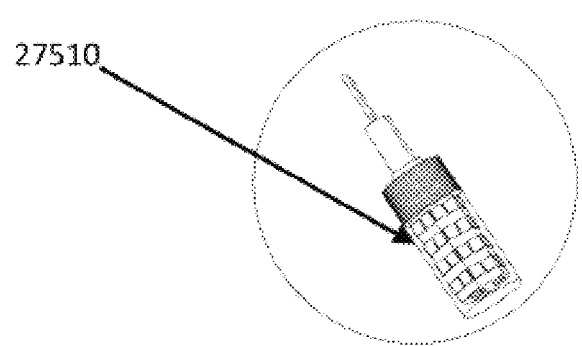
FIG. 35 shows a close-up view of an LED.

FIG. 34 shows an expanded lighting element of the lamp post 3200 and FIG. 35 shows a detail view of an LED 27510 which is located between mirrored plates for lighting panels 27520. The LED 27510 (or equivalent light source) is secured in a socket at the apex of the pyramid housing.

Figure 36:
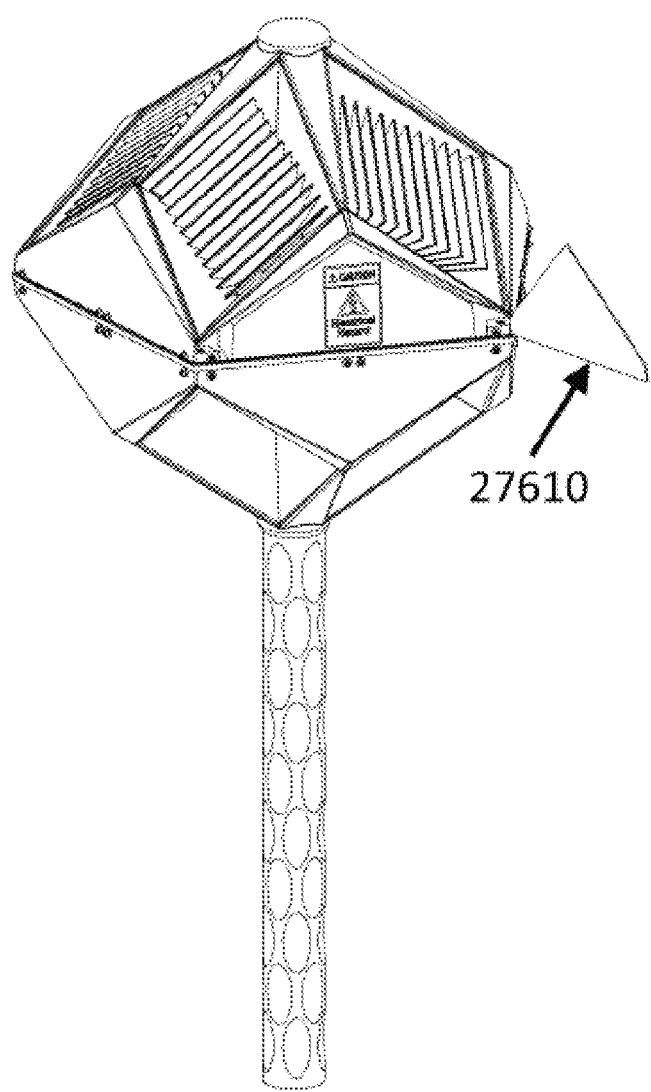
FIG. 36 shows another view of the lamp post.

FIG. 36 shows another view of the lamp post 3200. As shown, the access door 27610 is opened for access to the interior, for example, for maintenance.

Figure 37:
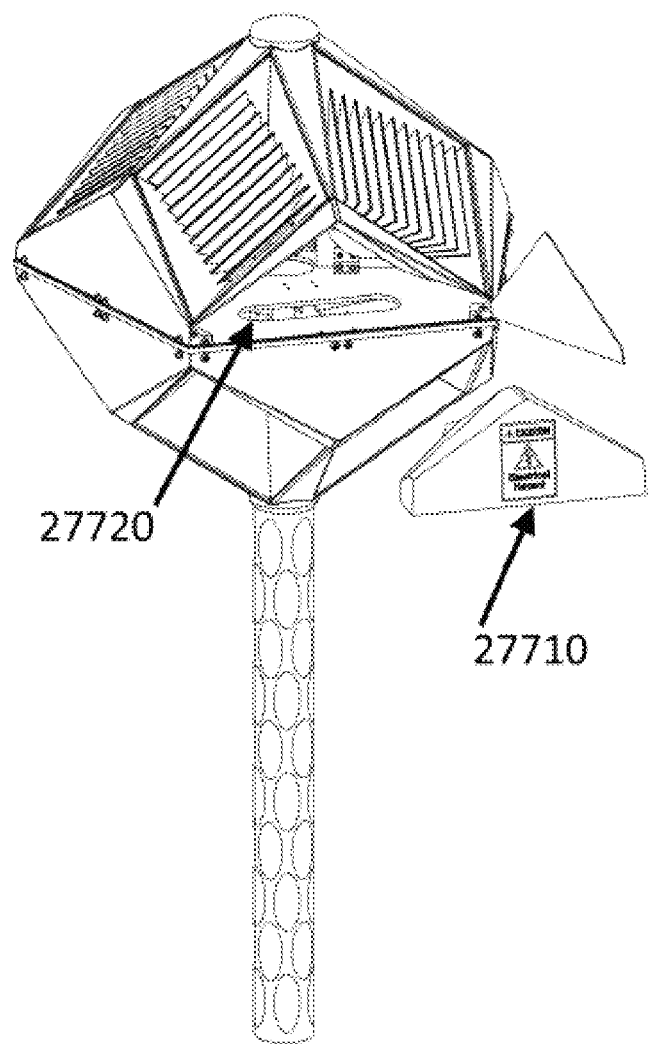
FIG. 37 shows an expanded view of an electronics housing of the lamp post.

FIG. 37 shows an expanded view of an electronics housing 27710 of the lamp post 3200. The electronics housing 27710 is removed and a wiring thru slot 27720 is visible in the support plate for the housing.

Figure 38:
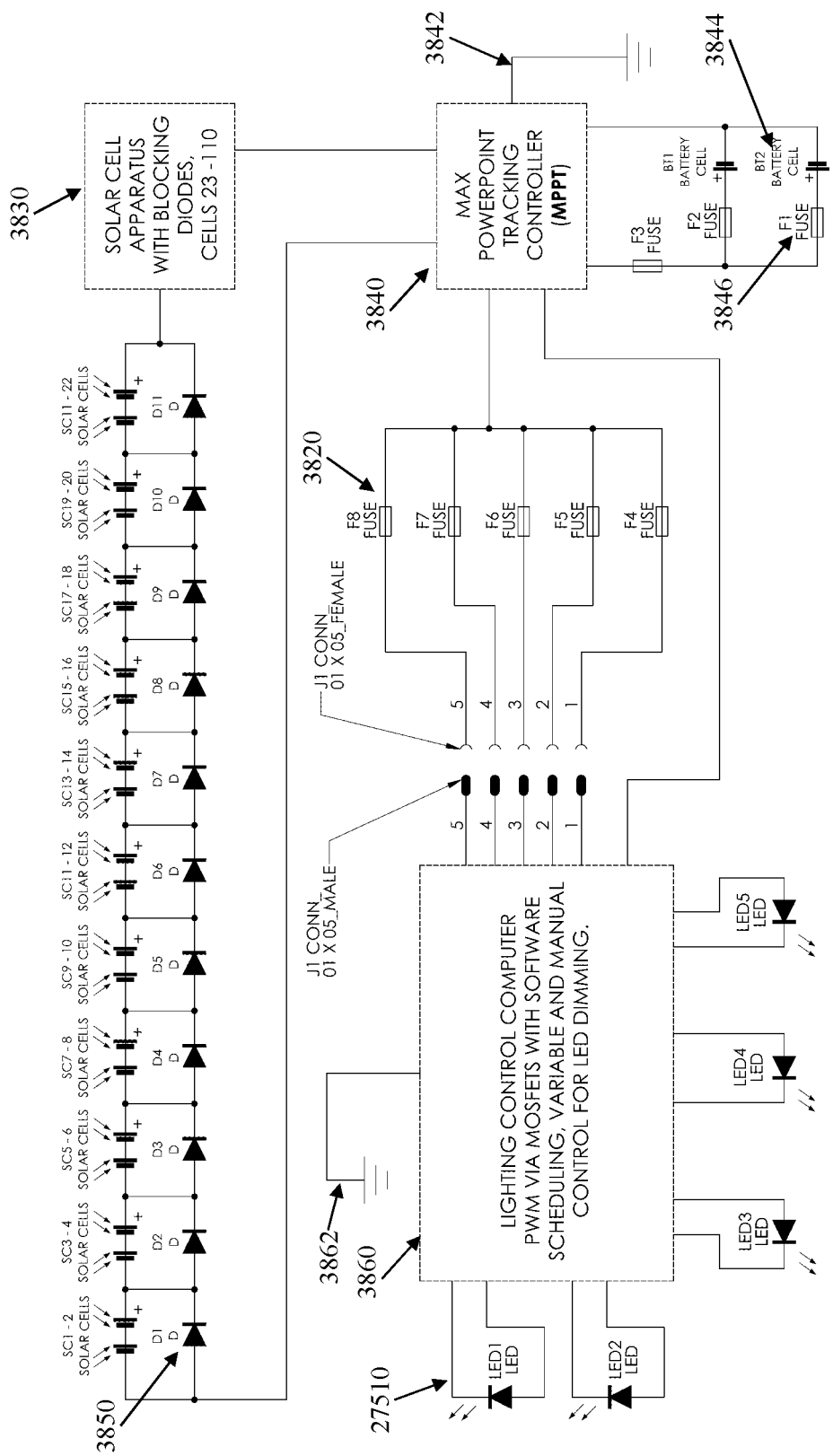
FIG. 38 illustrates a lighting control schematic for use with a lamp post.

FIG. 38 illustrates a wiring diagram for use with a lamp post. The wiring diagram including components that are in the Electronics Housing 27710. The Wiring Diagram shows the connections between broom solar sandwiches 27420, bypass diodes 3850, Max PowerPoint Tracking Controller (MPPT) 3840, the MPPT ground 3842, Batteries (or equivalent storage), the batteries' fuses 3846, fuses 3820 to female connectors, male connectors to the Lighting Control Computer 3860 and its ground 3862. The Lighting Control Computer is then connected to the LEDs 27510.

Figure 39:
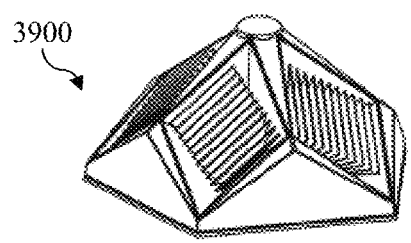
FIG. 39 shows a top of a solar charged lamp post.

FIG. 39 shows a top 3900 of a solar charged lamp post. The top 3900 includes an internal sheet metal frame which supports the solar panel and lighting housing. This frame slides over a mounting pole and is secured.

Figure 40:
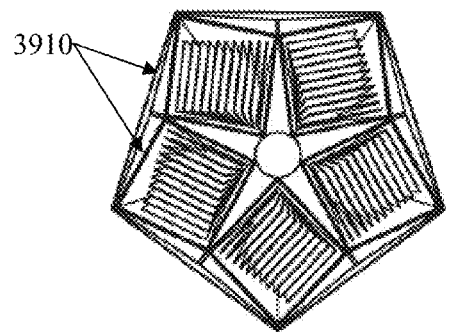
FIG. 40 shows another view of the solar charged lamp post.
Figure 41:
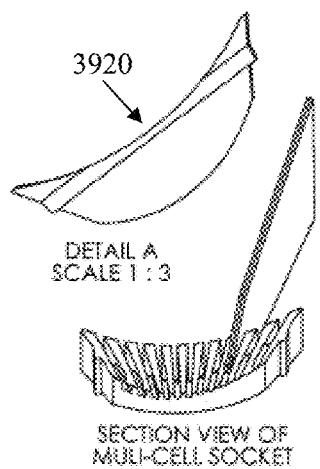
FIG. 41 shows a broom array socket of the solar charged lamp post.
Figure 42:
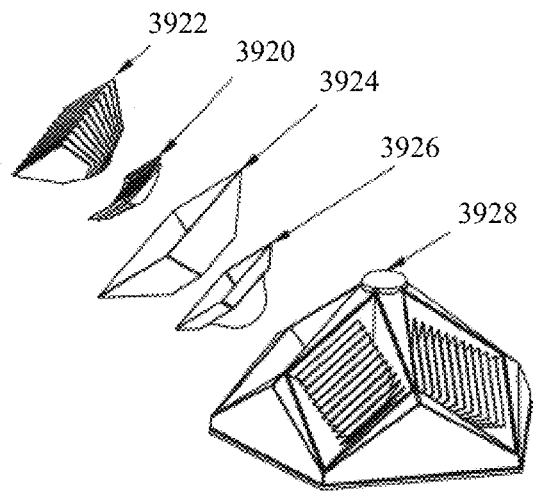
FIG. 42 shows an expanded view of one broom array of the solar charged lamp post.
Figure 43:
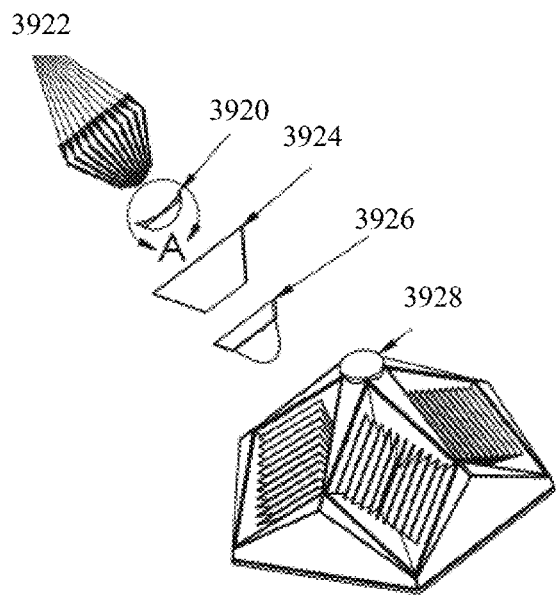
FIG. 43 shows another expanded view of one broom array of the solar charged lamp post.

FIG. 40 shows another view of the top 3900 of the solar charged lamp post. FIG. 41 shows a broom array socket 3920 of the top 3900 of the solar charged lamp post. FIGS. 42 and 43 show expanded views of one broom array 3910 of top 3900 of the solar charged lamp post. The top shell 3900 includes various solar panel sections. Each section, includes a mirror assembly 3924 and back cover 3926 in an inverted pyramid shaped cavity. A multi-cell fan 3922 is secured in a multi-cell socket 3920 which is disposed in the inverted pyramid shaped cavity. The multi-cell fan 3922 includes several solar cell sandwiches 3922 of two solar cell 3922a, 3922b folded together. Each solar cell sandwiches 3922 may also include an acrylic layer between the two solar cell 3922a, 3922b. The two solar cell 3922a, 3922b may be bifacial solar panels able to collect light from either side/face.

Figure 44:
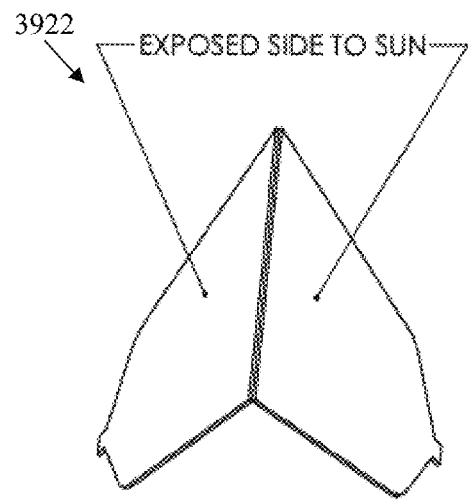
FIG. 44 shows one solar panel pane of the broom array.
Figure 45A:
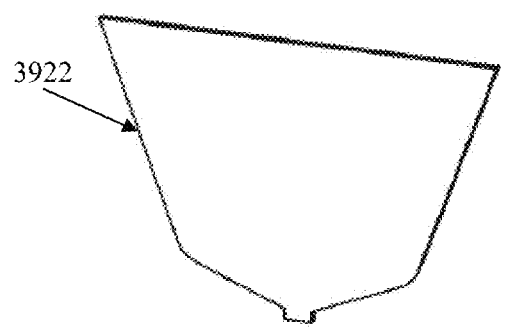
FIGS. 45A and 45B, collective referred to as FIG. 45, show the solar panel pane of the broom array.
Figure 45B:
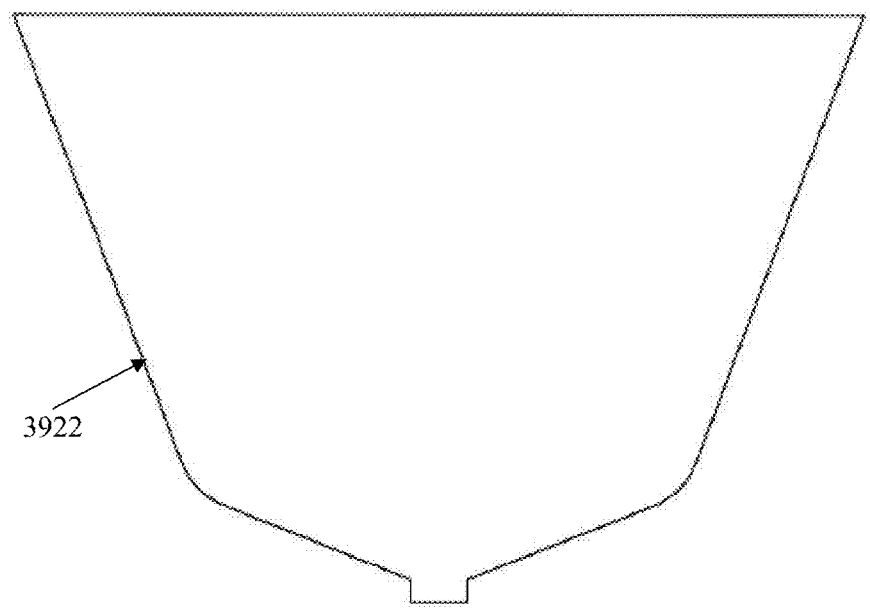
Figure 46:
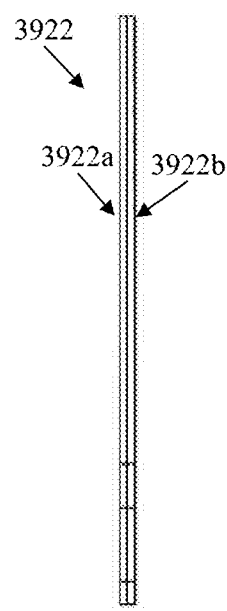
FIG. 46 shows a side view of the solar panel pane of the broom array.
Figure 47:
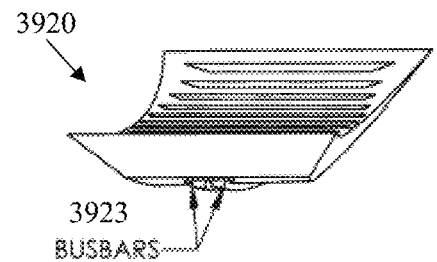
FIG. 47 shows the socket of the broom array.

FIG. 44 shows one solar panel pane 3922 of the broom array 3910. FIGS. 45A and 45B, collective referred to as FIG. 45, show the solar panel pane 3922 of the broom array 3910. FIG. 46 shows a side view of the solar panel pane 3922 of the broom array 3910.

Figure 48:
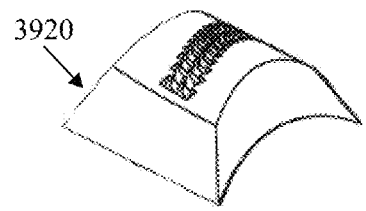
FIG. 48 shows the bottom of the socket of the broom array.
Figure 49:
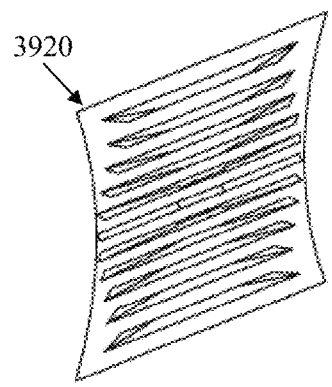
FIG. 49 shows another view of the socket of the broom array.
Figure 50:
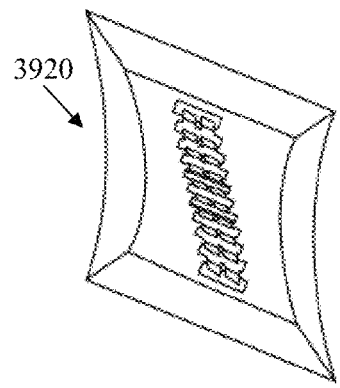
FIG. 50 shows another view of the bottom of the socket of the broom array.

FIGS. 47-50 show the socket of the broom array 3910. FIGS. 48 and 50 show the bottom of the socket 3920 of the broom array 3910 where the busbars 3923 may be located.

Figure 51:
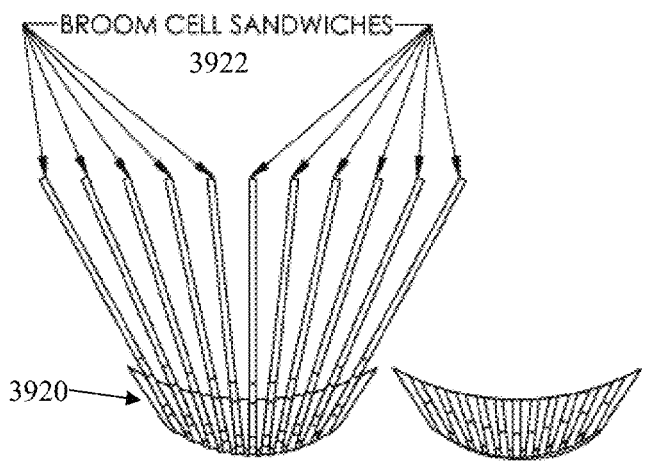
FIG. 51 shows the broom array.
Figure 52:
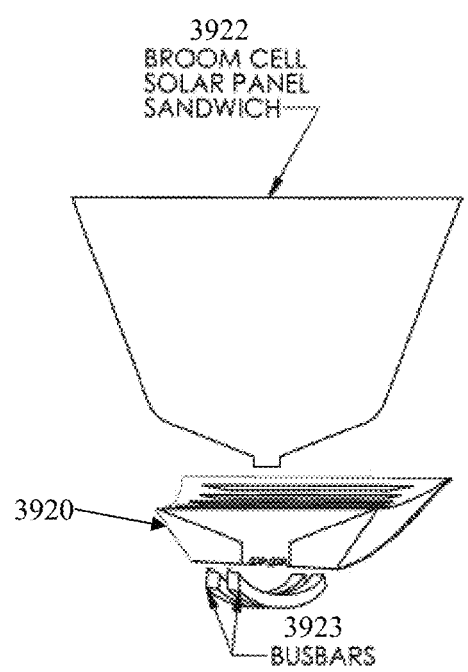
FIG. 52 shows another view of the broom array.

FIG. 51 shows the broom array 3910 with the individual broom cell sandwiches (or panes) 3922 are fanned out within the socket 3920. FIG. 52 shows an expanded view of one individual broom cell sandwich 3922, the socket 3920 and busbars 3923.

Figure 53:
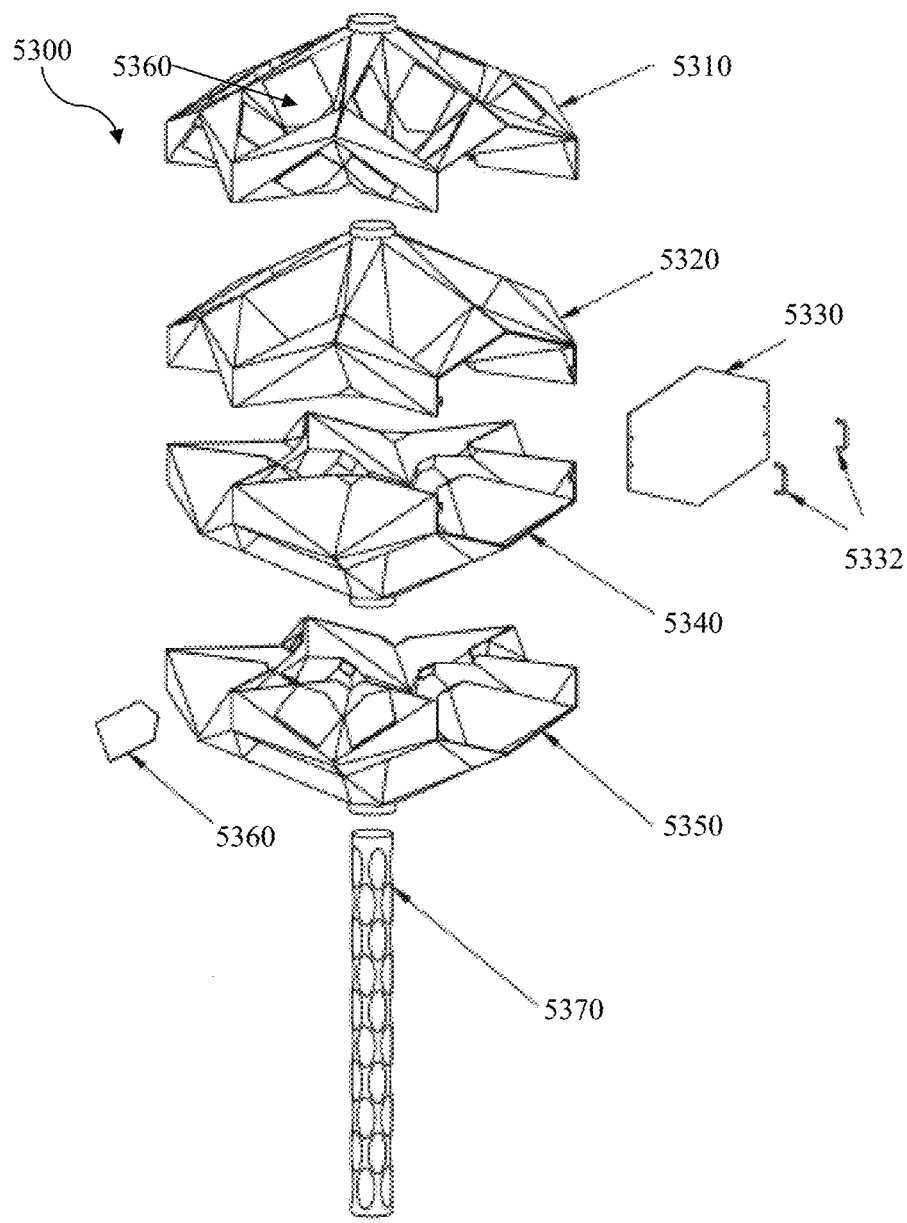
FIG. 53 shows an expanded view of a frame of the solar charged lamp post.

FIG. 53 shows an expanded view of a frame of the solar charged lamp post 5300. The lamp unit 5300 includes a stack of elements including a unit top 5310, a unit bottom 5350, a control unit top 5320 and a control unit bottom 5340. A control unit panel 5330 with control unit handles 5332 that can be used to cover an opening in the control unit (made up of the control unit top 5320 and the control unit bottom 5340. The lamp unit is placed atop a dimpled pole 5370.

The top unit 5310 include six solar panel assemblies featuring various solar cells 5360 disposed in an inverted pyramid shaped cavity.

The solar panel street lamp 5300 may include additional components to utilize any excess energy collected from the sun. These elements may include recharging stations, communication routers, audio systems, etc.

The various solar panels described may include standard solar panels which generate energy by collected solar radiation, whether in the visible or IR spectrum. Additionally, the solar panels may include thermo-radiative panels which generate energy by emitting radiation. These panels can be used either in conjunction with standard solar panels and/or in separate arrays so as to enable the lamp post to continue to generate energy when the sun is not visible, e.g., at night.

Figure 54:
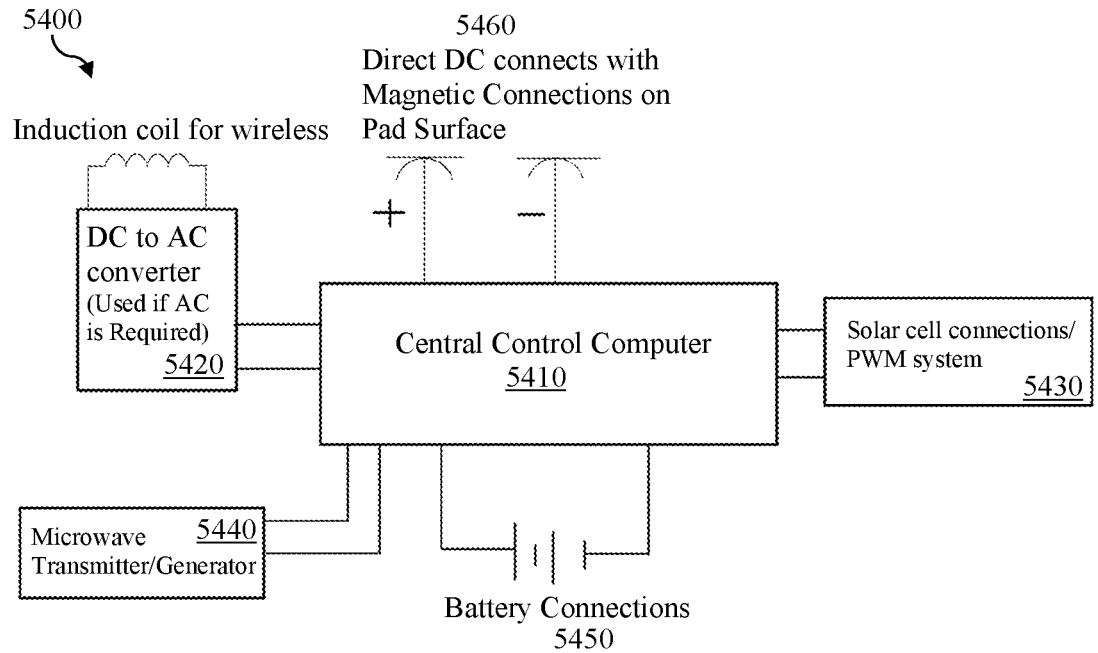
FIG. 54 illustrates a schematic of a system for controlling a solar charged lamp post.

In some non-limiting embodiments a master controller oversees all street light functions including battery management, illumination, and drone handling. FIG. 54 illustrates a schematic 5400 of a system for controlling a solar charged lamp post. As shown, a central control computer 5410 is connected to various components of the lamp post including a DC to AC converter 5420 which runs an induction coil for wireless charging and direct DC connects 5460. The central control computer 5410 can also monitor and control the solar cells via connections 5430 and the microwave transmitter 5440 for drone guidance. Additionally, the central control computer 5410 can monitor the battery connections 5450 to ensure the batteries are charged properly.

As described, the lamp post may be charged by either solar or wind energy. In other non-limiting embodiments, the lamp post may also include an electrical grid connection. This connection may be used to supplement charging as needed and/or to provide energy to the grid. An microinverter can supply solar- or wind-generated electricity back to the grid when the battery is fully charged. This process may be controlled, at least in part by the central control computer 5410.

The central control computer 5410 may also control LED brightness. The brightness can be adjusted as necessary desired according to ambient light or battery charge state.

Figure 55:
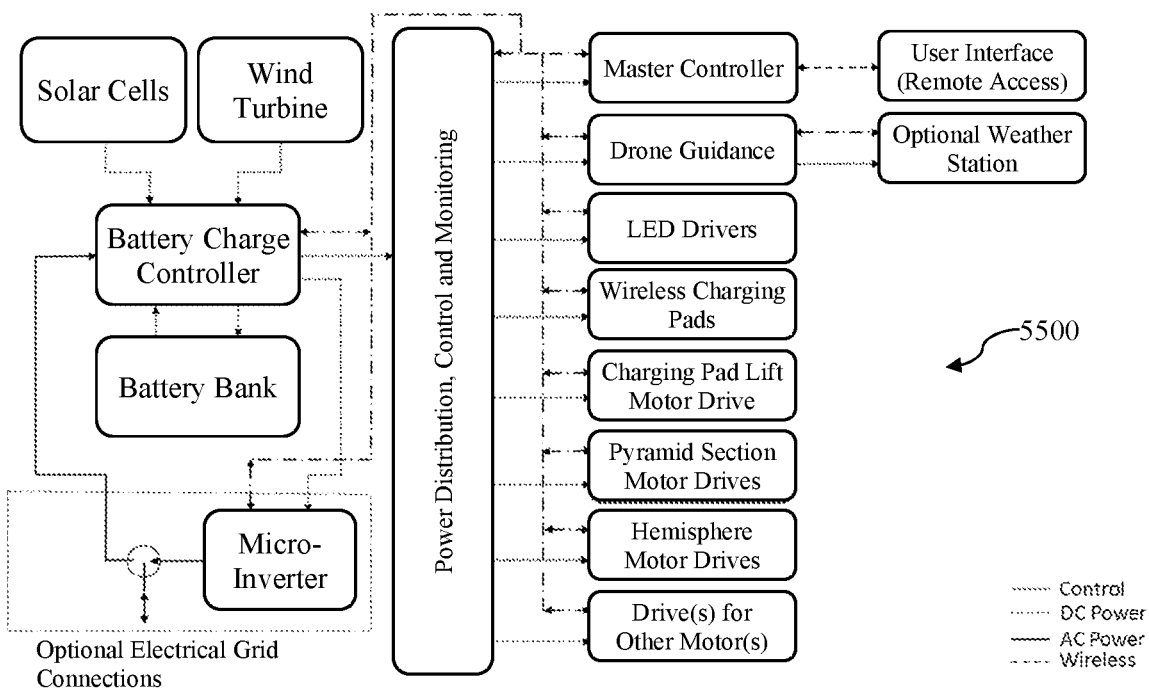
FIG. 55 demonstrates a simple function template of a system for controlling a drone charging lamp post.
Figure 56:
FIG. 56 illustrates a home screen for an application.
Figure 56:
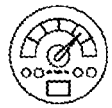
Figure 56:
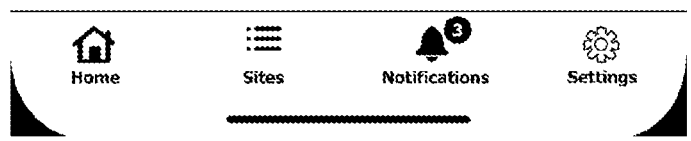

FIG. 55 demonstrates a simple function template 5500 of a system for controlling a drone charging lamp post. The various features, such as solar cells, wind turbine, battery bank, etc. can be controlled by a battery charge controller which in turn is controlled by Power Distribution Control and Monitoring. Other features/functions, such as the drone guidance, LED drivers, various motors, etc. can also receive information from the Power Distribution Control and Monitoring. A master controller can communicate with most elements as well as the user interface.

In some non-limiting embodiments, the central control computer 5410 may also be responsive to a mobile app that allows user override of the controller to be accessed wirelessly for control or diagnostic purposes.

The 4D Vision Light system client can utilize a mobile device to monitor the health of the overall system as well as individual system stations. The user can also schedule configuration changes (e.g. lights on/off) and perform manual configuration overrides on an ad hoc basis. Furthermore, the mobile application can receive system notifications to inform the user of time sensitive error conditions. Finally, the user can use the application edit their system profile and access application support functions.

The graphical user interfaces (GUIs) shown in FIGS. 56-70 illustrate a sample implementation of a client interface.

In some embodiments, the mobile application first presents the user with a Login screen where they enter secure system credentials. Upon successful authentication, the application can present the user with a Home Screen 5600, see FIG. 56, which includes a basic set of overall system health metrics. The application can also present a set of icons (represented in the sample as a bottom tab bar) to allow the user to navigate to other areas of functionality within the application.

Figure 57:
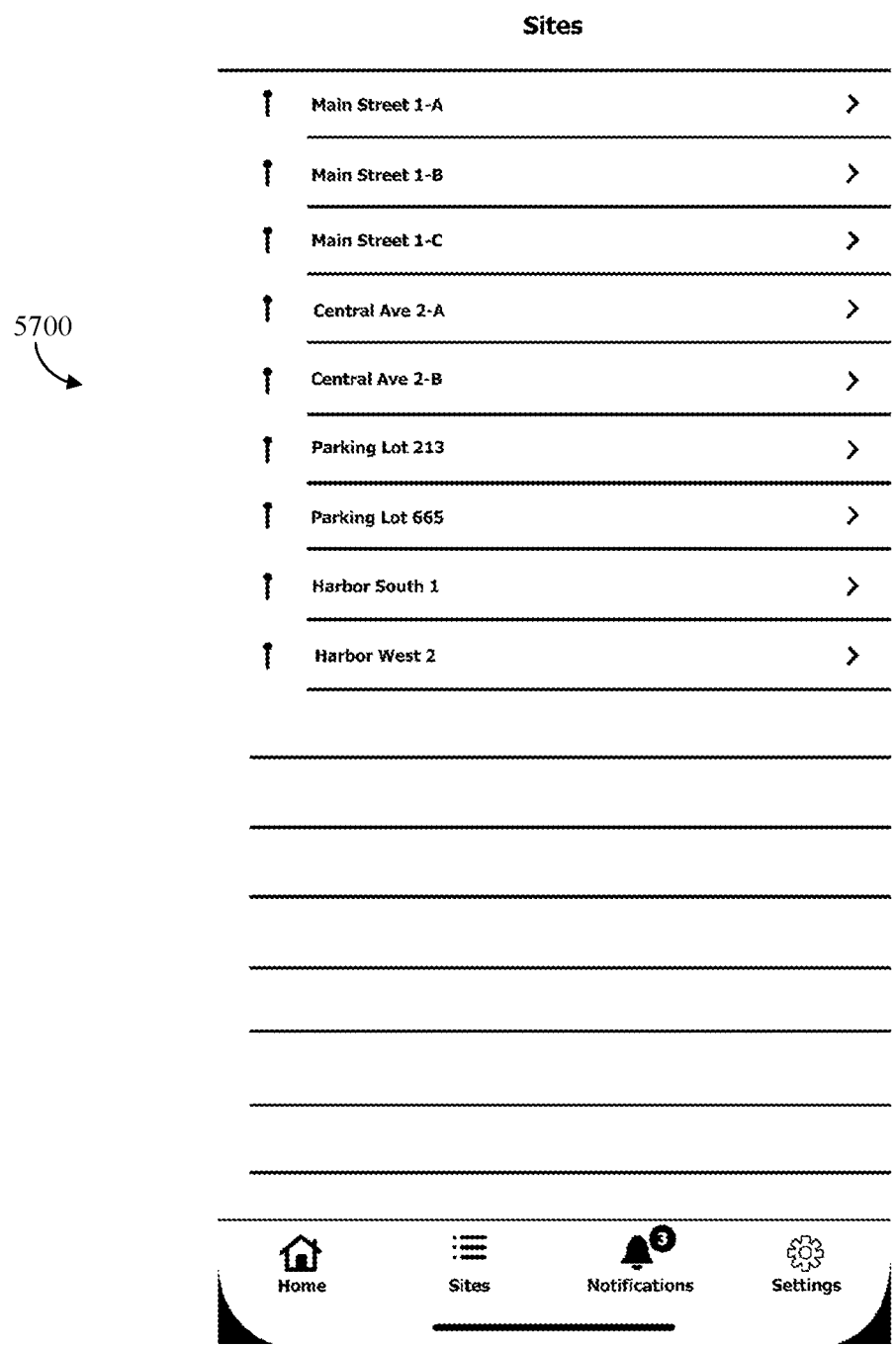
FIG. 57 illustrates a sites screen for the application.
Figure 58:
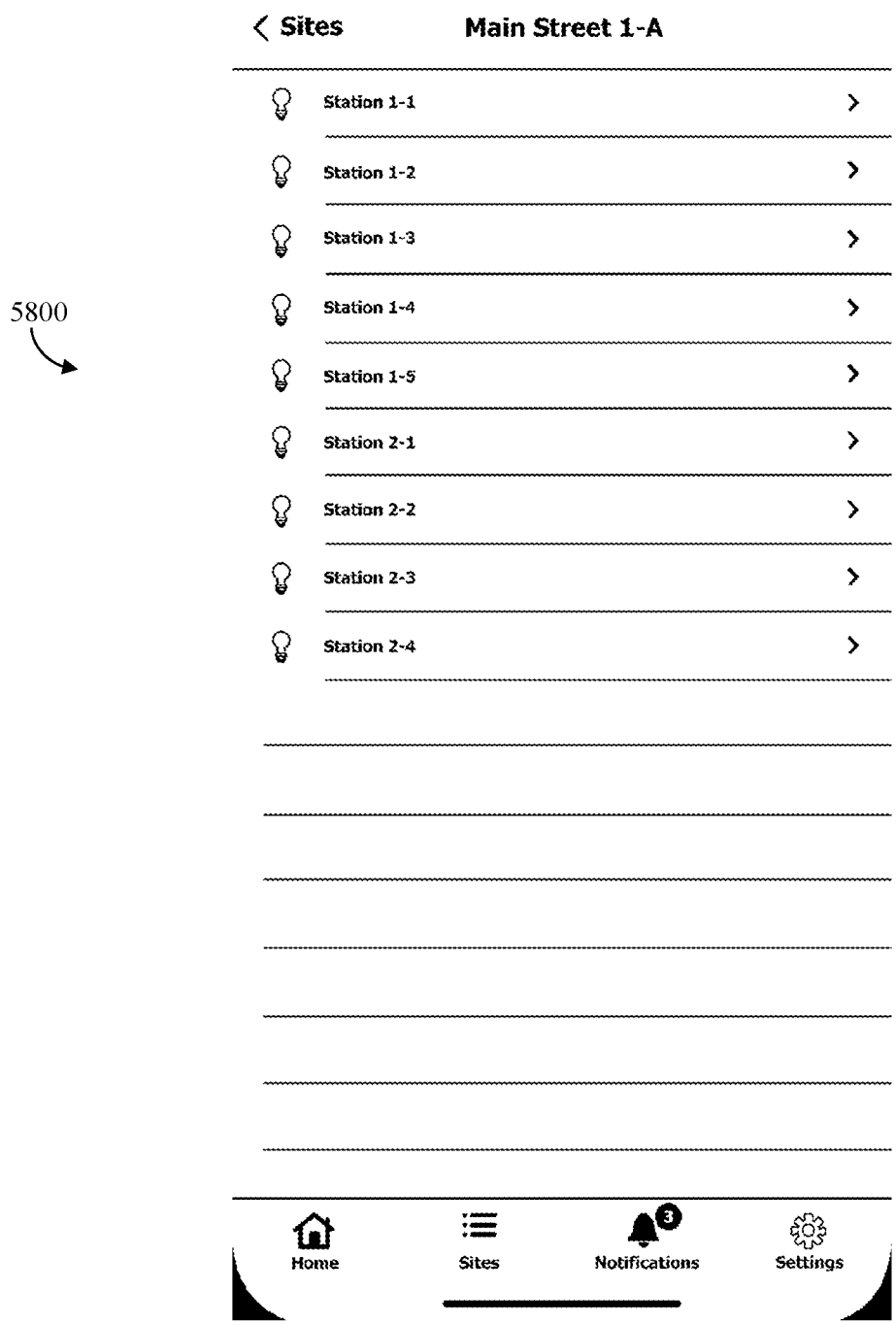
FIG. 58 illustrates a station select screen for one site in the application.
Figure 59:
FIG. 59 illustrates a station status screen for the application.
Figure 59:
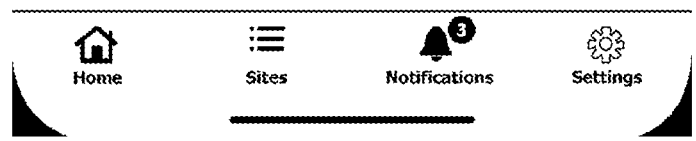

The Sites area, see FIGS. 57-58, shows how the system might permit the user to navigate within the system's logical or geographical hierarchy from the highest level, see Sites screen 5700, down to an individual station, see station select screen 5800. For example, the user might navigate from a city, to a particular city block, to a street, and finally to a particular station. This can be achieved by selecting entries in a series of tables which allow the user to drill down to a station of interest and be presented with a station status screen 5900, see FIG. 59.

Figure 60:
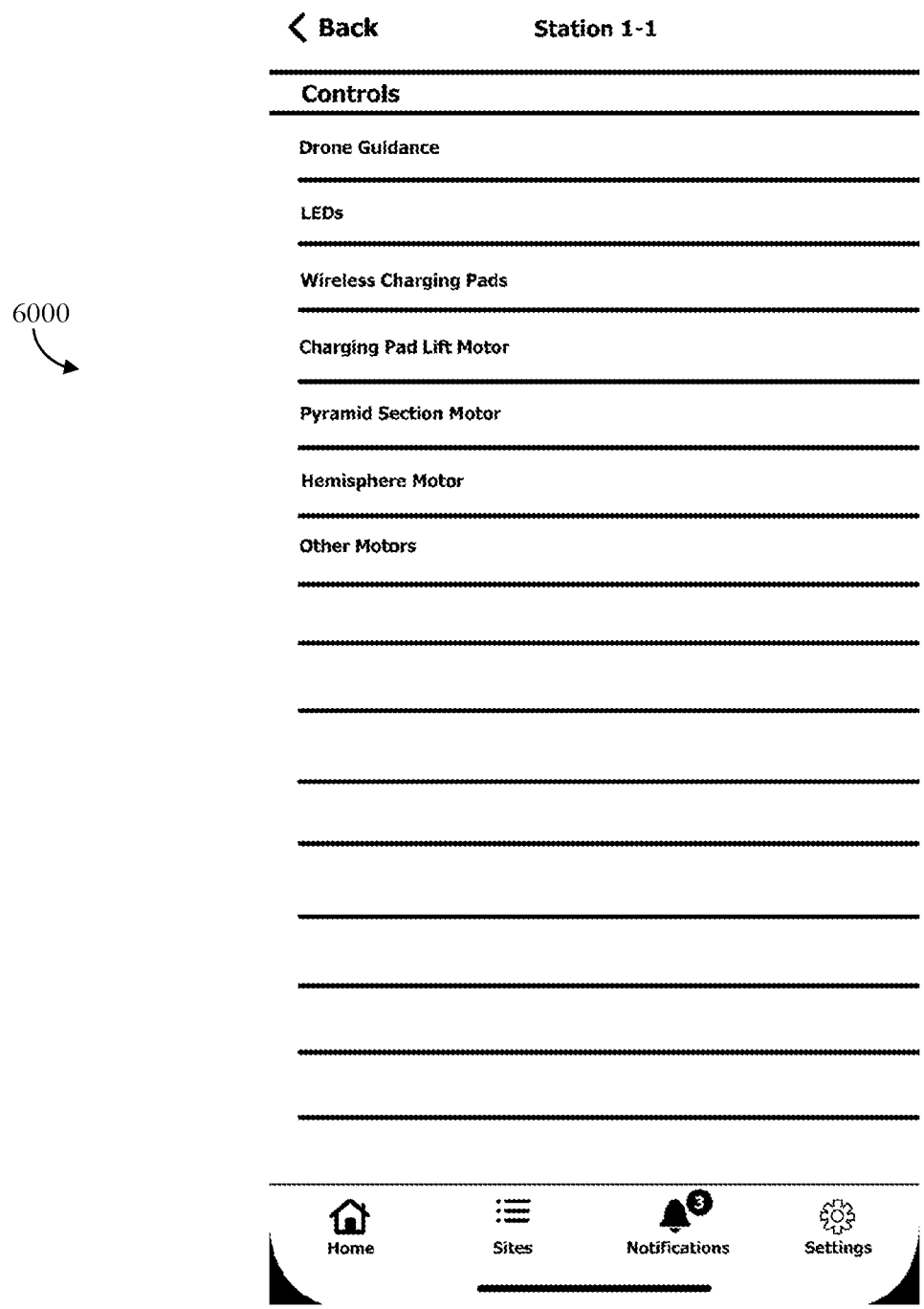
FIG. 60 illustrates a control screen for the application.
Figure 61:
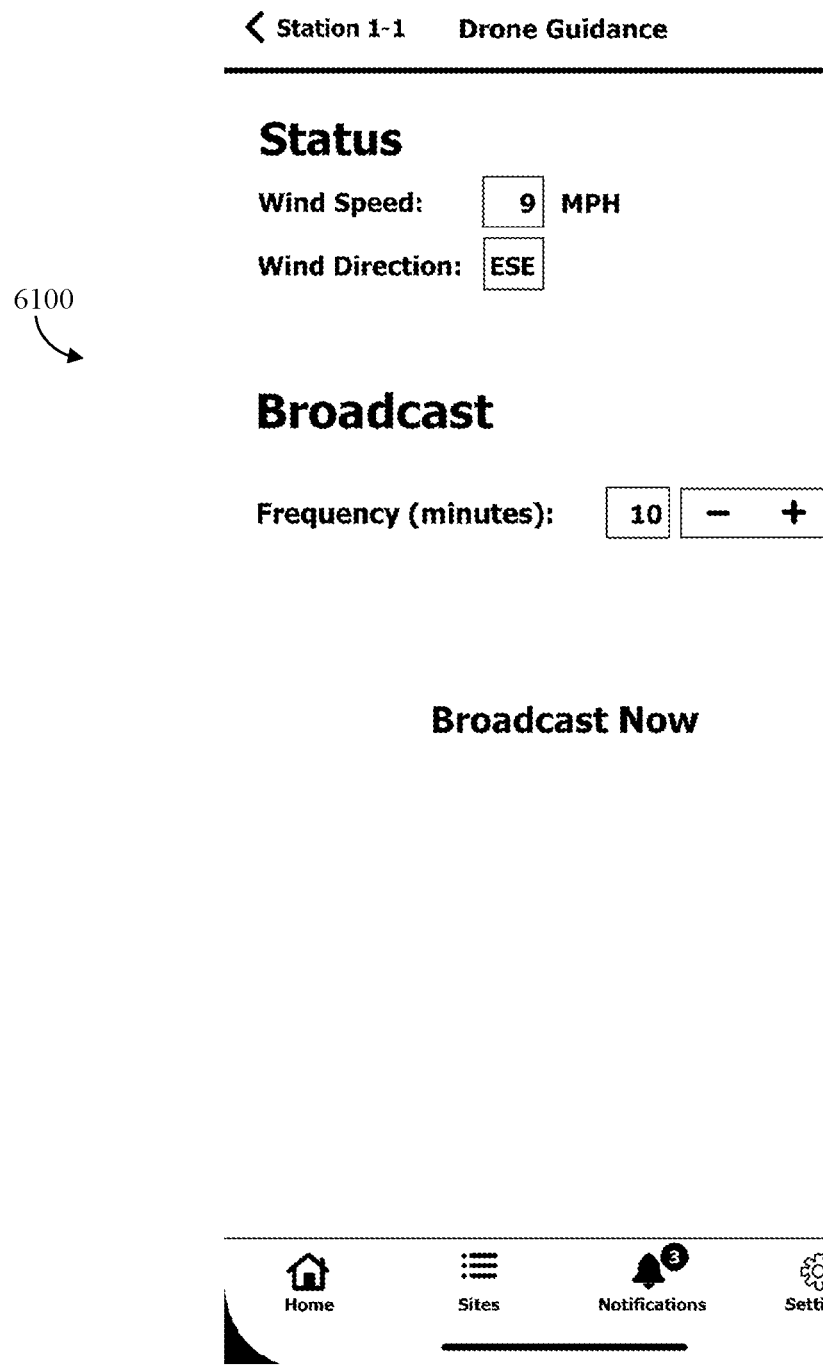
FIG. 61 illustrates a drone guidance status screen for the application.
Figure 62:
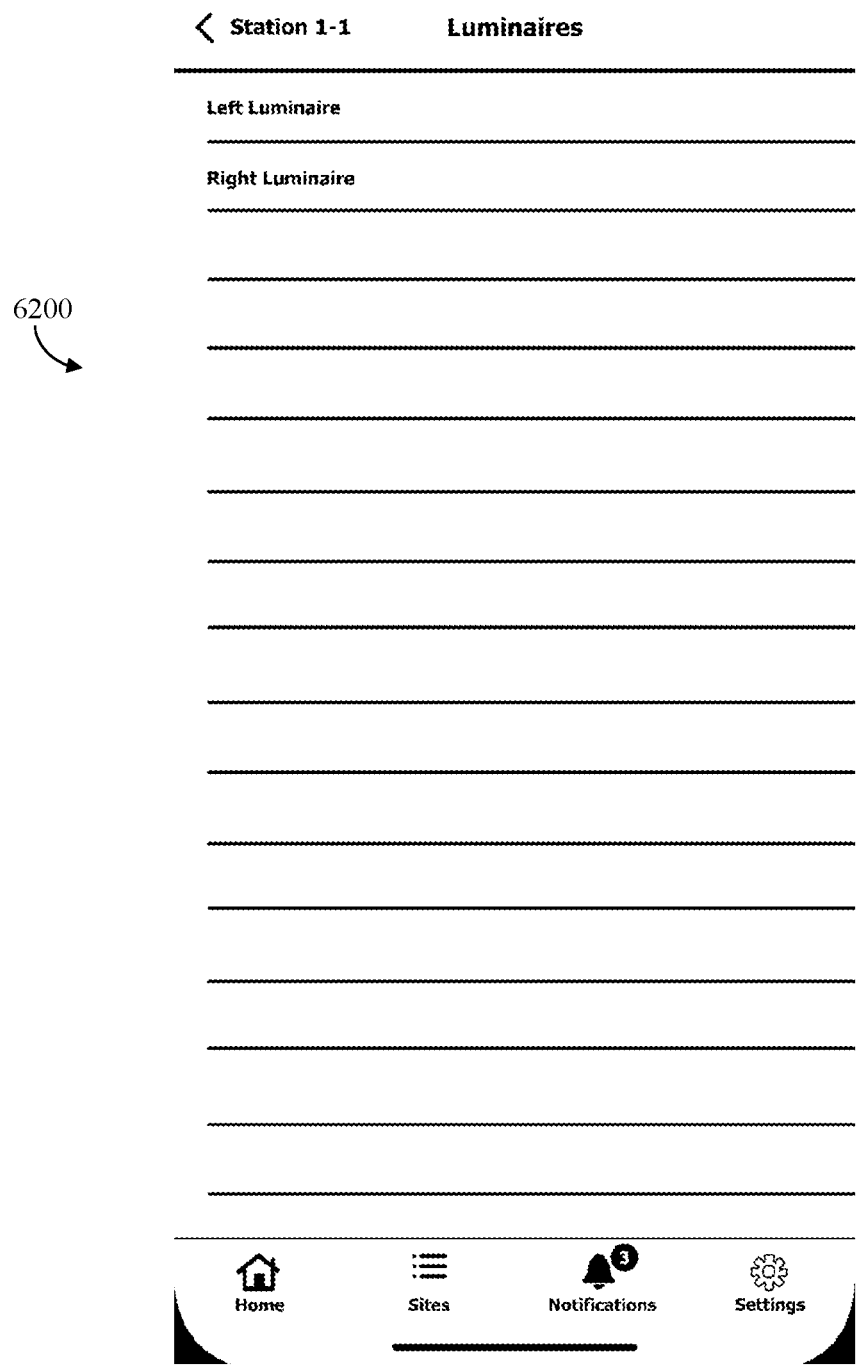
FIG. 62 illustrates a luminaire select screen for the application.
Figure 63:
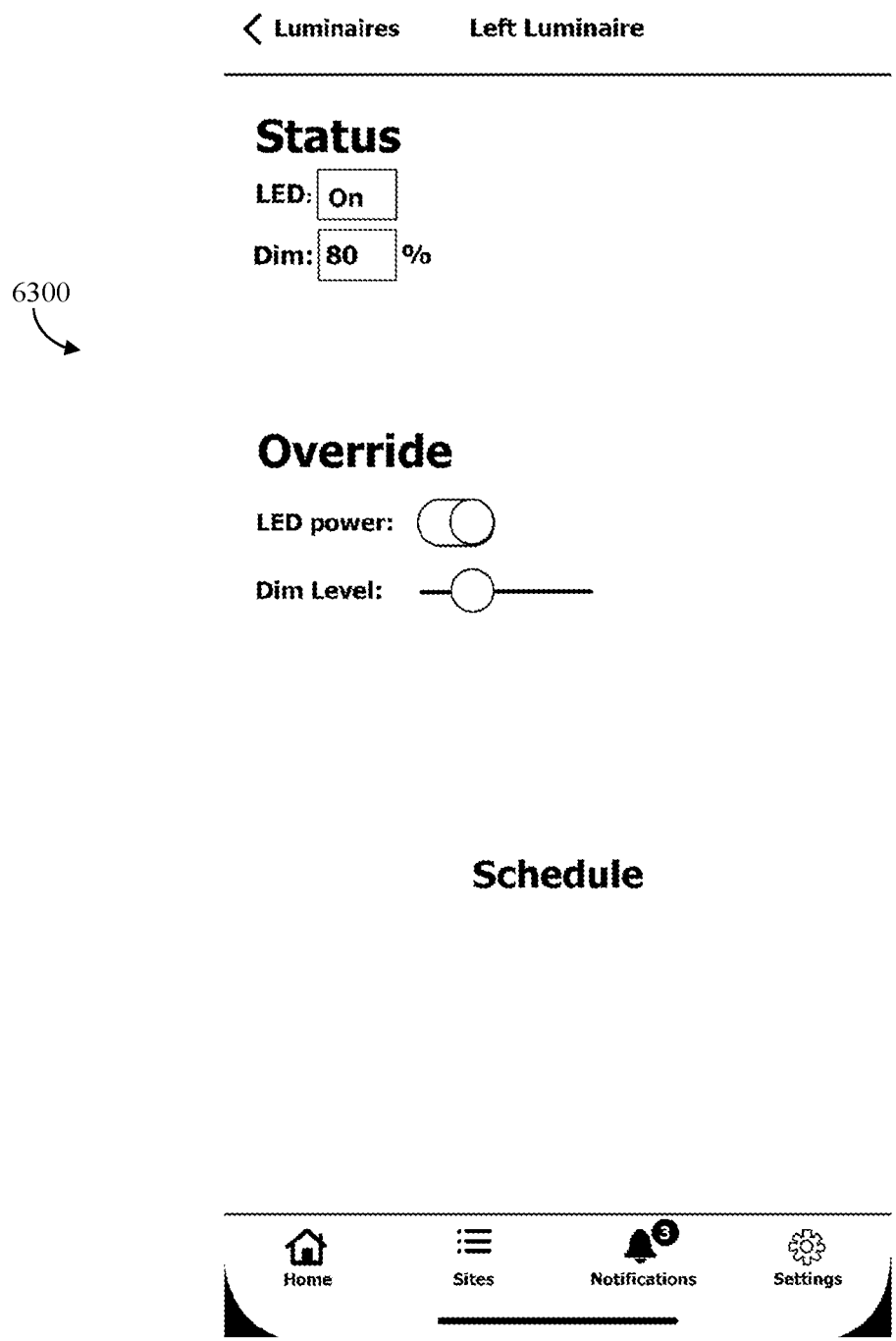
FIG. 63 illustrates a luminaire control screen for the application.
Figure 64:
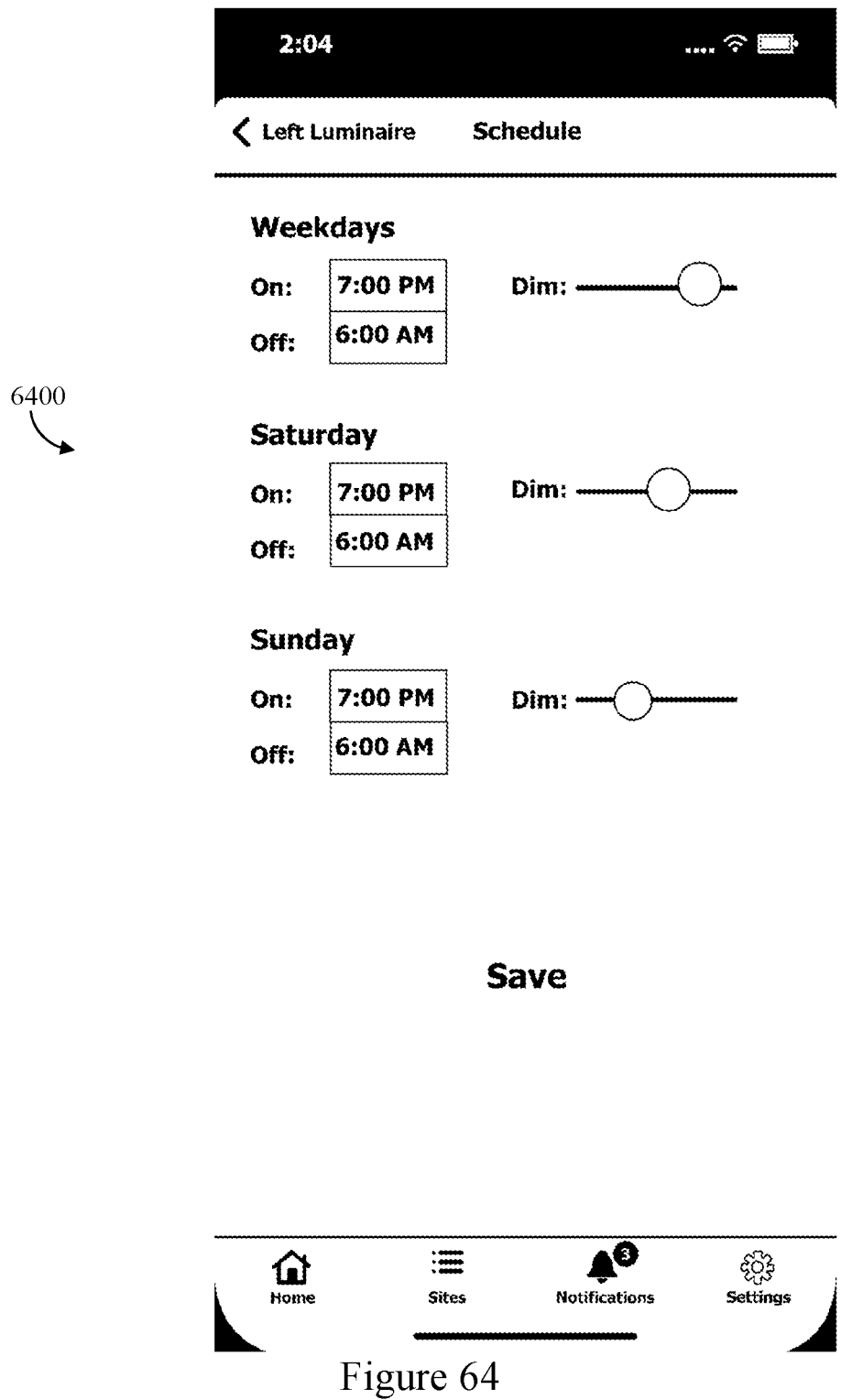
FIG. 64 illustrates a scheduling screen for the application.
Figure 65:
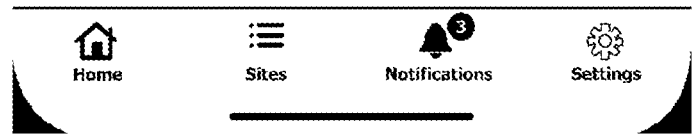
FIG. 65 illustrates a charging pad lift control screen for the application.
Figure 67:
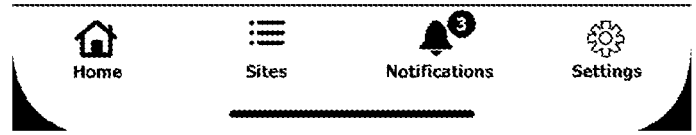
FIG. 67 illustrates a hemisphere motor control screen for the application.
Figure 68:
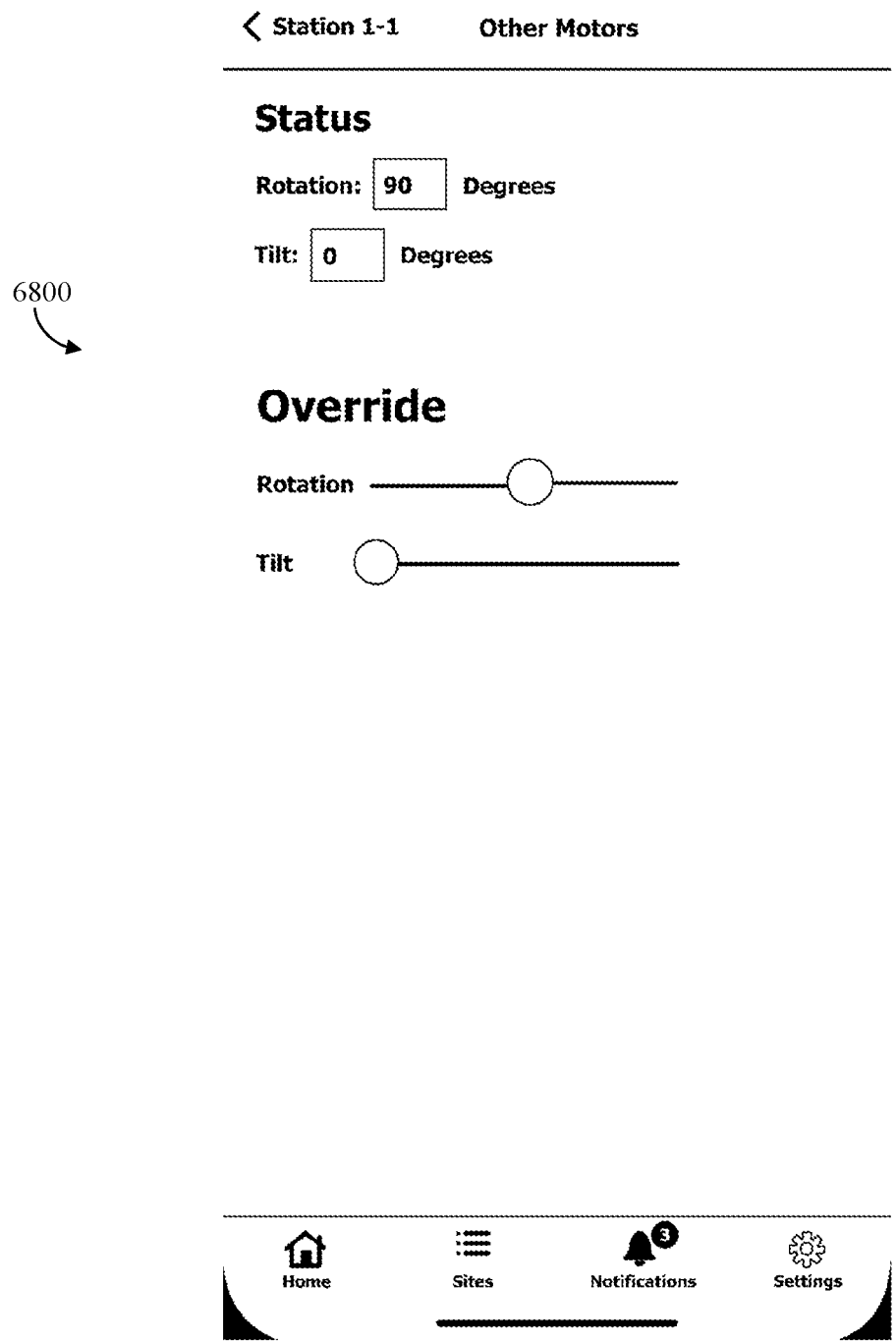
FIG. 68 illustrates a motor control screen for the application.
Figure 69:
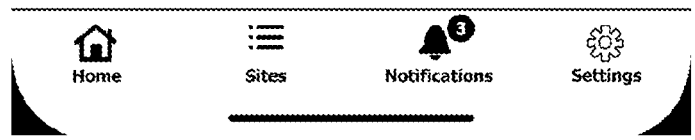
FIG. 69 illustrates a notification screen for the application.
Figure 70:
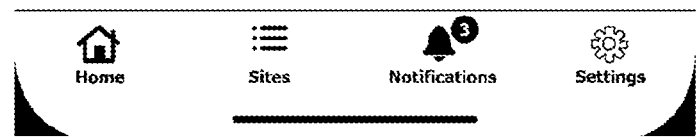
FIG. 70 illustrates a battery charge failure screen for the application.

Once the user has selected a particular system node (station), the application can provide an interface to the various functions of the system Master Controller, see control screen 6000 of FIG. 60. The individual controls might be grouped into functionality areas (Drone Guidance, LEDs, Charging Pads, Hemisphere Motor, etc.), and within the areas the user can view current system status and perform manual overrides.

Drone Guidance—On the drone guidance status screen 6100, the user might observe current environmental conditions such as wind speed and direction. The user might set up a broadcast frequency for the station to inform system subscribers such as drones.

LEDs—On luminaire select screen 6200, the user can select specific luminaires and on the luminaire control screen 6300 the user can observe and configure luminaire parameters such as power on/off and dimmer settings for a selected luminaire. The user could also set and override automatic system status changes based on time-of-day and day-of week using the scheduling screen 6400.

Charging Pad Lift Motor—On the charging pad lift control screen 6500, the user could observe the current status of the center charging pad, and also manually change the position to raised or lowered.

Pyramid Section Motor—On the pyramid control screen 6600, the user could observe the current condition of the Pyramid (closed/open) and manually change the condition.

Hemisphere Motor—On the hemisphere motor control screen 6700, similar to the Pyramid Section Motor, the user can observe and change the condition of the hemisphere (closed/open).

Other Motors—On the motor control screen 6800, the user can observe the rotation and tilt of the station and manually change these settings.

The Notifications area, shown on the notification screen 6900, illustrates how the system might display system alerts broadcast to all users or a role-based subset of users. In the sample application, selecting an entry in the Notifications table displays further details of the alert condition, see battery charge failure screen 7000. The system might provide controls to perform appropriate remedial actions such as a system reset to a default configuration.

The sample application can also offer the client the ability to modify notification behavior and real-time updating on their specific mobile device. For example, a user who is on-call for system health monitoring might wish to receive audible and haptic signals upon receipt of an alarm condition. Later, when the user's on-call shift ends, they might choose to quiesce incoming notifications and simply allow the system to store alarm entries in the Notifications list for later review. The Setting screen can also display troubleshooting information such as application version and build numbers. Finally, the Settings area can offer the user access to application help and support functions.

Various operations described are purely exemplary and imply no particular order. Further, the operations can be used in any sequence when appropriate and can be partially used. With the above embodiments in mind, it should be understood that additional embodiments can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and otherwise manipulated.

Any of the operations described that form part of the presently disclosed embodiments may be useful machine operations. Various embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

The foregoing description has been directed to particular embodiments. However, other variations and modifications may be made to the described embodiments, with the attainment of some or all of their advantages. Modifications to the above-described systems and methods may be made without departing from the concepts disclosed herein. Accordingly, the invention should not be viewed as limited by the disclosed embodiments. Furthermore, various features of the described embodiments may be used without the corresponding use of other features. Thus, this description should be read as merely illustrative of various principles, and not in limitation of the invention.

What is claimed is:

1. A solar powered lamp post comprising:
    at least one solar panel assembly disposed in an inverted pyramid, the at least one solar panel assembly is configured to generate energy,
    wherein each of the at least one side solar panel assembly includes:
        a top solar panel, wherein the top solar panel is bifacial,
        a bottom solar panel, wherein the bottom solar panel is bifacial, and
        a reflective disc disposed between the top solar panel and the bottom solar panel and configured to reflect light onto the top solar panel and the bottom solar panel;
    at least one drone charging station configured charge a drone using the energy generated, and
    at least one light generating elements powered by the energy generated.

2. The solar powered lamp post of claim 1, further comprising a pyramid wall system frame including a plurality of petals configured to move from a closed, pyramidal configuration to an open configuration.

3. The solar powered lamp post of claim 2, wherein each petal includes a plurality of petal-located solar panel assemblies on an exterior facing side when in the closed, pyramidal configuration.

4. The solar powered lamp post of claim 2, wherein each petal includes a drone landing pad on an upward facing side when in the open configuration.

5. The solar powered lamp post of claim 1, wherein the at least one drone charging station is configured to provide at least one of: wireless charging, direct charging, inferred guidance, and a microwave transmitter.

6. The solar powered lamp post of claim 1, wherein the at least one drone charging station comprises a central drone charging station, the central drone charging station having a lift mechanism configured to move the central drone charging station from a lowered position to an upward extended position.

7. The solar powered lamp post of claim 6, wherein lift mechanism comprises one of: a scissor lift and a platform having four actuators disposed on corners of the platform.

8. The solar powered lamp post of claim 1, further comprising a retractable cover configured to move from a sealed position over the at least one drone charging station and an opened position.

9. The solar powered lamp post of claim 1, wherein the at least one drone charging station comprises an inferred guidance beacon configured to communicate with a drone.

10. The solar powered lamp post of claim 1, further comprising at least one side rhombus, wherein the at least one solar panel assembly comprises at least one side solar panel assembly disposed in the at least one side rhombus.

11. The solar powered lamp post of claim 10, wherein each of the at least one side solar panel assembly further includes:
    an acrylic layer disposed between the top solar panel and the bottom solar panel, and
    wherein the reflective disc is disposed in the acrylic layer.

12. The solar powered lamp post of claim 10, wherein the at least one side rhombus further includes at least one insert configured to reflect light onto a back side of the at least one side solar panel assembly disposed in the at least one side rhombus.

13. The solar powered lamp post of claim 10, wherein the at least one side rhombus further includes at least one drainage slot configured to allow water to flow out of the at least one side solar panel assembly.

14. The solar powered lamp post of claim 13, wherein the at least one drainage slot is configured to drain into a dimple on an opposite side of the at least one side rhombus, wherein the dimple is configured to reduce lift created as air flows over the at least one light generating elements.

15. The solar powered lamp post of claim 13, wherein the at least one drainage slot is disposed in an inverted pyramid shaped cavity, wherein the sides of the inverted pyramid shaped cavity are configured to reflect light onto the at least one side solar panel assembly disposed in the at least one side rhombus.

16. The solar powered lamp post of claim 10, wherein the solar powered lamp post further includes at least one motor configured to rotate the at least one side rhombus about an axis radial to a post of the solar powered lamp post.

17. The solar powered lamp post of claim 10, wherein the solar powered lamp post further includes at least one motor configured to swivel the at least one side rhombus about an axis of a post of the solar powered lamp post.

18. The solar powered lamp post of claim 1, wherein the at least one solar panel assembly comprises at least one mirrored surface.

19. The solar powered lamp post of claim 18, wherein the mirrored surface is a red chrome surface.

20. The solar powered lamp post of claim 18, wherein the mirrored surface is a chemically applied surface.

21. A solar powered lamp post comprising:
at least one solar panel assembly disposed in an inverted pyramid, the at least one solar panel assembly is configured to generate energy;
at least one drone charging station configured charge a drone using the energy generated, and
at least one light generating elements powered by the energy generated,
wherein the at least one solar panel assembly comprises a solar panel element, the solar panel element includes:
a top solar panel,
a bottom solar panel, and
an acrylic layer disposed between the top solar panel and the bottom solar panel.

22. The solar powered lamp post of claim 1, the solar powered lamp post further comprising:
a post; and
a turbine engine disposed around the post, the turbine engine configured to generate energy from wind.

23. The solar powered lamp post of claim 22, wherein the turbine engine includes a plurality of turbine fins, each fin comprising at least one dimple configured to direct wind blowing over the fin into the turbine engine.

24. The solar powered lamp post of claim 23, wherein the at least one dimple is further configured to reduce wind drag on an opposite side of the associated fin.

25. A solar powered lamp post comprising:
at least one solar panel assembly disposed in an inverted pyramid, the at least one solar panel assembly is configured to generate energy;
at least one light generating elements powered by the energy generated,
wherein each of the at least one solar panel assembly includes:
a top solar panel, wherein the top solar panel is bifacial,
a bottom solar panel, wherein the bottom solar panel is bifacial, and
a reflector disposed between the top solar panel and the bottom solar panel and configured to reflect light onto the top solar panel and the bottom solar panel; and
a communication component configured to receive instructions from a user and to provide status information to the user; and
a controller configured to operate the solar powered lamp post in accordance with the instructions from the user.

26. The solar powered lamp post of claim 25, wherein the reflector is disposed in an acrylic layer.

27. The solar powered lamp post of claim 25, wherein the instructions from the user include instructions to illuminate the at least one light generating elements at given times of day.

28. The solar powered lamp post of claim 25, wherein the status information comprises at least one of:
a current illumination level of the at least one light generating elements; and
a current charge level of at least one battery charging system.

29. The solar powered lamp post of claim 25, wherein the instructions from the user are generated by an application operating on a mobile device.

30. The solar powered lamp post of claim 25, further comprising at least one drone charging station configured charge a drone using the energy generated.

* * * * *